United States Patent [19]
Ohnaka et al.

[11] Patent Number: 5,715,358
[45] Date of Patent: Feb. 3, 1998

[54] METHOD FOR RECORDING AT LEAST TWO PICTURE SIGNALS AND METHOD OF REPRODUCTION AT LEAST TWO PICTURE SIGNALS

[75] Inventors: Takashi Ohnaka; Katsuhiko Matsushita, both of Osaka-fu; Daisuke Kishimoto, Hyogo-ken; Minoru Takahashi, Osaka-fu; Minoru Kume, Osaka-fu; Mitsutaka Komoike, Osaka-fu; Katsunori Hirase, Osaka-fu; Tatsuo Tanaka, Kyoto-fu; Hirotsugu Murashima, Nara-ken; Osamu Idegata; Masafumi Nishi, both of Osaka-fu, all of Japan

[73] Assignee: Sanyo Electric Co., Ltd., Osaka-fu, Japan

[21] Appl. No.: 742,325

[22] Filed: Nov. 1, 1996

Related U.S. Application Data

[63] Continuation of Ser. No. 263,885, Jun. 22, 1994, abandoned.

[30] Foreign Application Priority Data

| Jun. 22, 1993 | [JP] | Japan | 5-150426 |
| Jun. 24, 1993 | [JP] | Japan | 5-153677 |
| Jun. 29, 1993 | [JP] | Japan | 5-159584 |
| Jul. 20, 1993 | [JP] | Japan | 5-179136 |
| Aug. 11, 1993 | [JP] | Japan | 5-199357 |
| Oct. 22, 1993 | [JP] | Japan | 5-264953 |
| Feb. 25, 1994 | [JP] | Japan | 6-028216 |
| Feb. 25, 1994 | [JP] | Japan | 6-028217 |

[51] Int. Cl.⁶ .................................................. H04N 5/76
[52] U.S. Cl. ................................................ 386/108; 348/42
[58] Field of Search ............................ 348/42, 43, 55; 360/22, 32; 386/1, 22, 24, 46, 95, 108, 125, 126; H04N 9/79, 5/76

[56] References Cited

U.S. PATENT DOCUMENTS

| 3,412,214 | 11/1968 | Gabor | 360/22 |
| 4,613,912 | 9/1986 | Shibata et al. | 360/19.1 |
| 4,633,332 | 12/1986 | Higurashi et al. | 360/10.3 |
| 4,656,527 | 4/1987 | Uchimi | 358/320 |
| 4,685,004 | 8/1987 | Takahashi et al. | 360/32 |
| 4,743,965 | 5/1988 | Yamada et al. | 348/43 |
| 4,772,960 | 9/1988 | Takahashi et al. | 360/8 |
| 4,862,292 | 8/1989 | Enari et al. | 360/8 |
| 5,003,385 | 3/1991 | Sudo | 348/42 |
| 5,012,351 | 4/1991 | Isono et al. | 358/342 |
| 5,260,773 | 11/1993 | Dischert | 348/42 |
| 5,416,510 | 5/1995 | Lipton et al. | 348/43 |
| 5,465,158 | 11/1995 | Morioka et al. | 358/310 |

OTHER PUBLICATIONS

Patent Abstracts of Japan, "Three–Dimensional Picture Signal Recording Device" filed Apr. 8, 1986 by Shigeyuki et al.

*Primary Examiner*—Tommy P. Chin
*Assistant Examiner*—Y. Lee
*Attorney, Agent, or Firm*—Nikaido Marmelstein Murray & Oram LLP

[57] ABSTRACT

In the event of recording a picture signal for left eye and a picture signal for right eye, a picture signal for one of right and left eyes limited in band by a low pass filter as being an additional signal and a picture signal for the other eye as being a primary signal, and the additional signal together with the primary signal are recorded on recording medium.

5 Claims, 34 Drawing Sheets

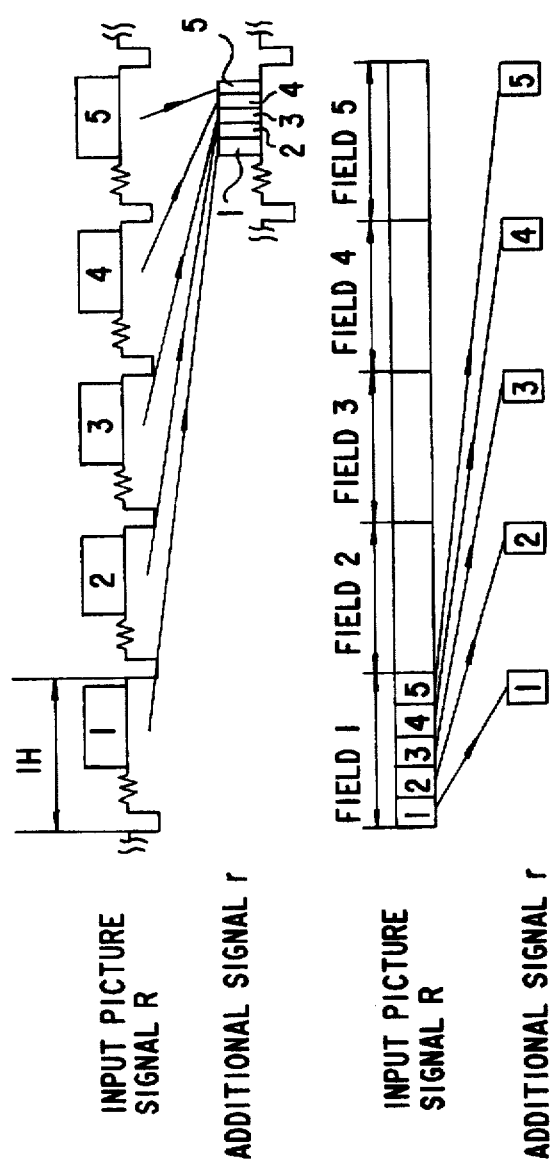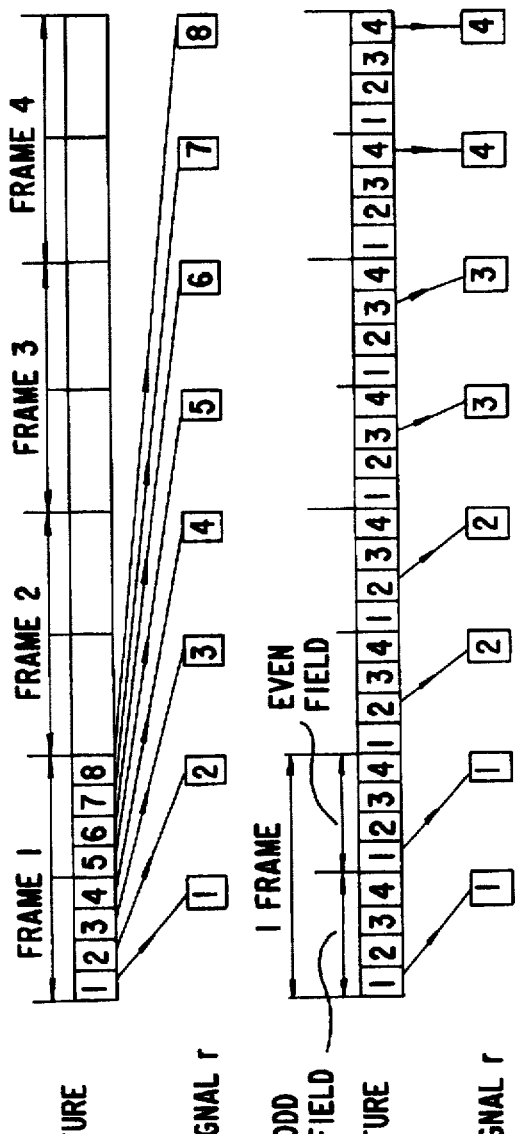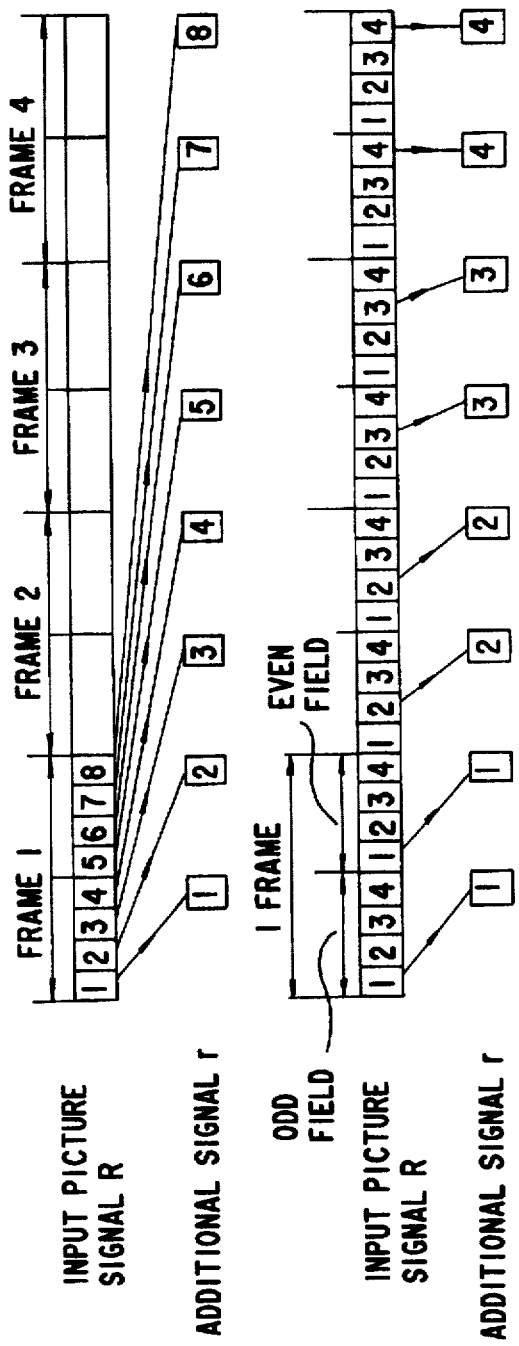
FIG.8A
FIG.8B
FIG.8C
FIG.8D

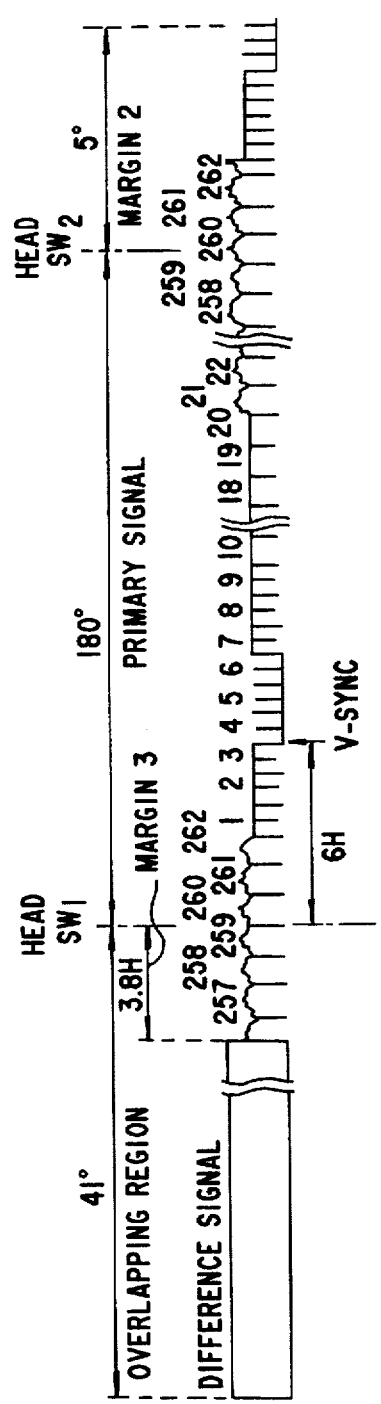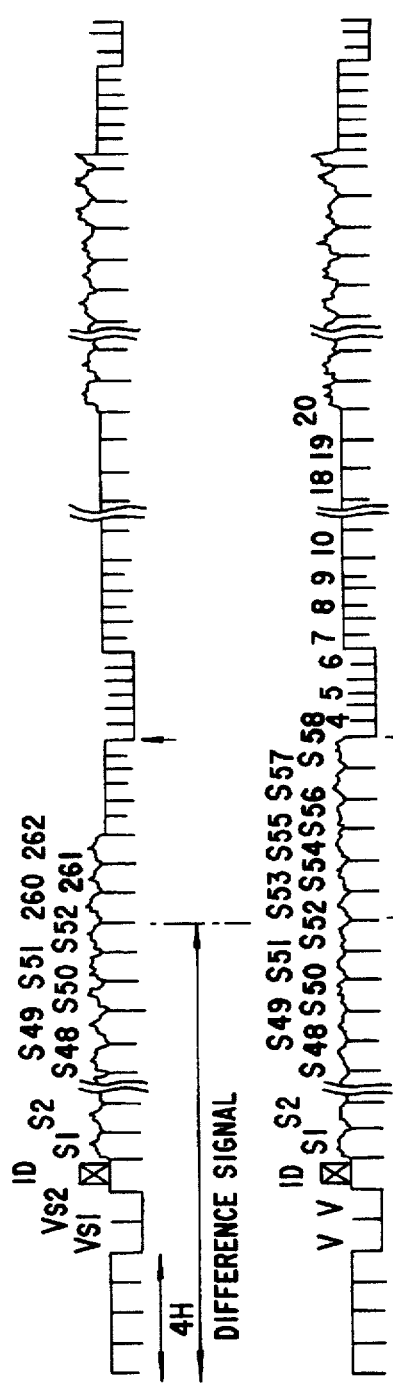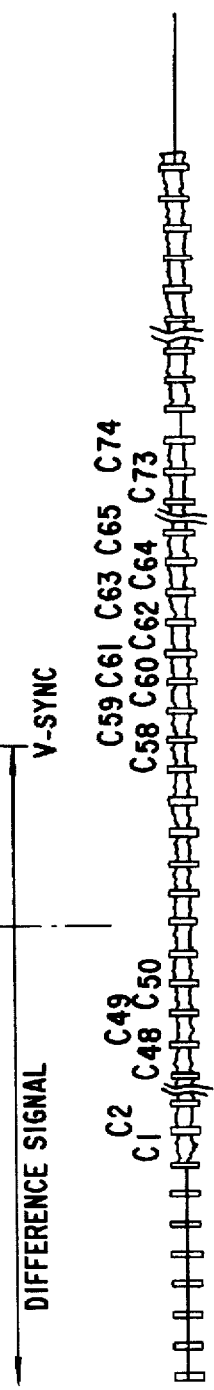
FIG.11(a) FIG.11(b) FIG.11(c) FIG.11(d)

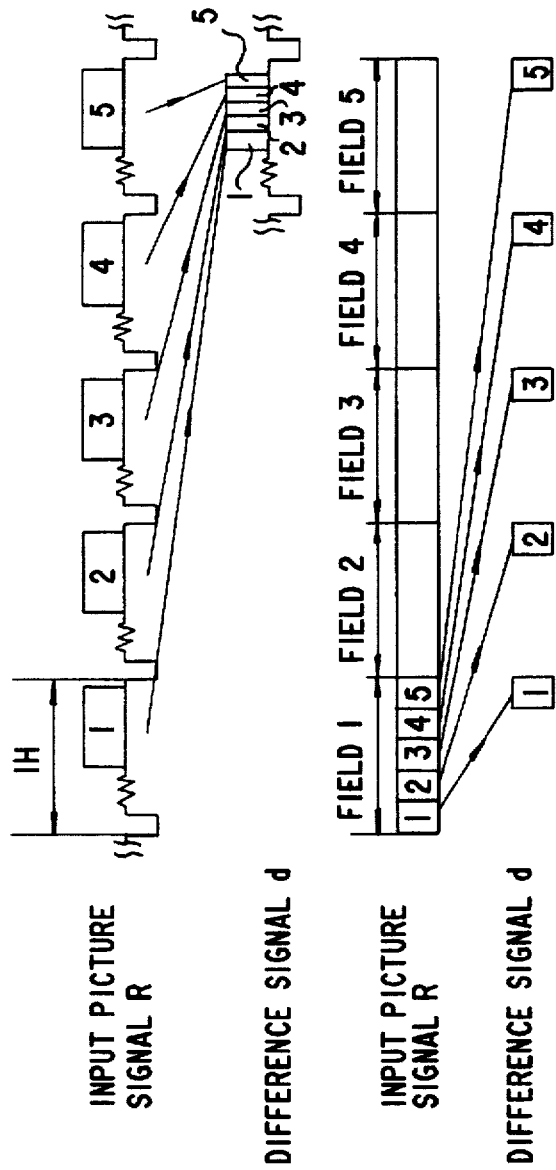
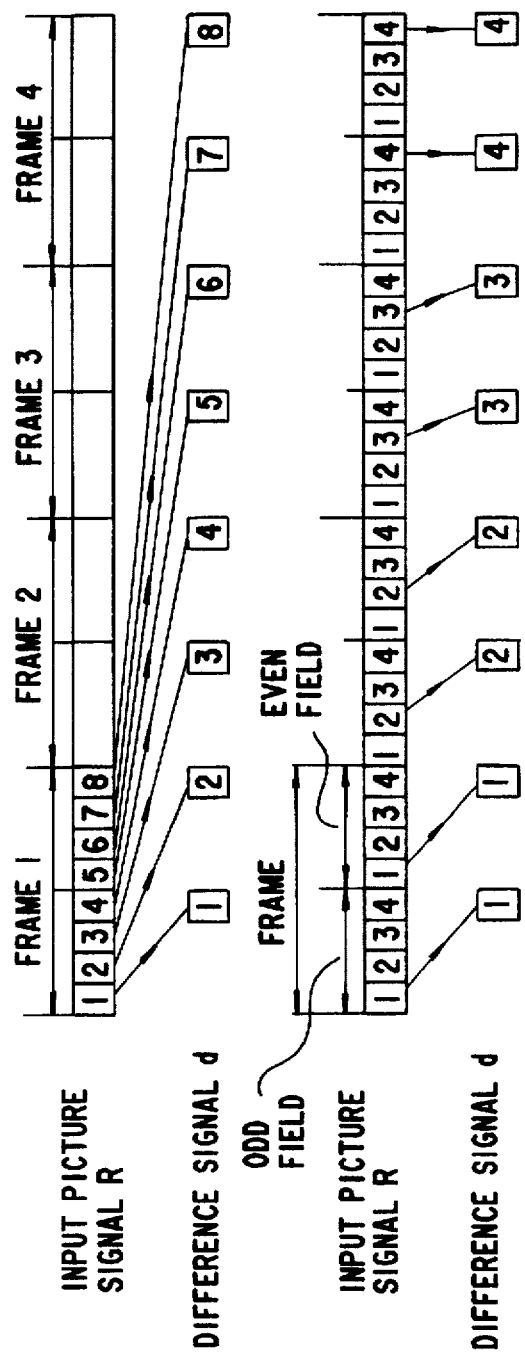
FIG.12A
FIG.12B
FIG.12C
FIG.12D

DISTANCE BETWEEN HEADS

DISTANCE BETWEEN HEADS

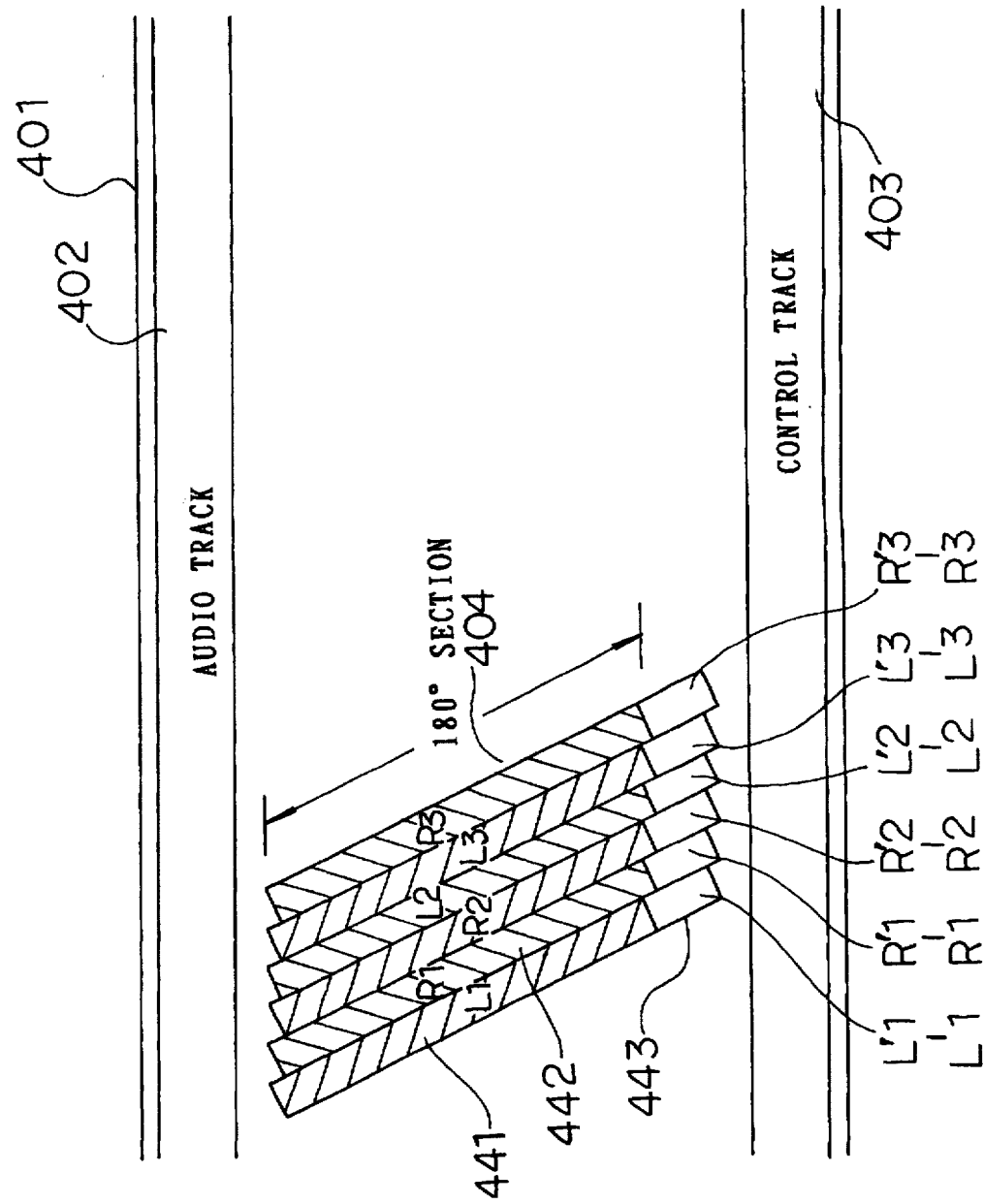

L

L'

R

R

L-R (L-R)'

METHOD FOR RECORDING AT LEAST TWO PICTURE SIGNALS AND METHOD OF REPRODUCTION AT LEAST TWO PICTURE SIGNALS

This application is a continuation Ser. No. 08/263,885 filed Jun. 22, 1994, now abandoned.

BACKGROUND OF THE INVENTION

1. Field of the Invention

The present invention relates to a method of recording on the same record tape at least two picture signals such as a picture signal for right eye and a picture signal for left eye which constitute stereoscopic pictures, and it relates to a method of reproducing at least two picture signals recorded in the above method from the record tape.

2. Description of the Prior Art

In recent years the stereoscopic picture technology has been highly developed, and various techniques have been well known, including a stereoscopic visual technique in which eye glasses having a shutter mechanism are used to see simultaneously a picture for left eye and a picture for right eye, and a technique in which stereoscopic pictures are directly seen without glasses by using a lenticular screen or a parallax barrier to make an adjustment so that a picture for left eye is directed to left eye while a picture for right eye is directed to right eye.

In order to record a picture signal for left eye and a picture signal for right eye, generally employed a method in which information on pictures taken by two cameras for left and right eyes are recorded on two record media (e.g. magnetic tape) in an ordinary VTR format by two video tape recorders (VTRs), and in order to reproduce the picture signal, two reproducing players are synchronously driven to simultaneously display pictures for left and right eyes.

There is another well known method in which a picture signal for either left eye or right eye is recorded as a primary signal on a single recording medium, and a difference signal between picture signals for left and right eyes is compressed on the time bases to record the resultant signal in an overlapping region of the recording medium, or otherwise, after the difference signal is recorded in parallel with a record track for a primary signal, in reproducing the recorded signal, a picture for one eye is reproduced based upon the primary signal while a picture for the other eye is reproduced based upon the primary signal and the difference signal (see Japanese Unexamined Patent Publication No. SHO62/236294).

A recording system in accordance with the above method, where the picture signals for left and right eyes are respectively recorded on the two separate recording media, is compatible with ordinary VTR systems since an ordinary VTR format can be used to record the picture on the recording media; however, since this system requires a specific control method to synchronously drive the two reproducing players, the hardware architecture is complicated.

Another recording system in accordance with the stereoscopic picture signal recording method disclosed in Japanese Patent Unexamined Publication No. SHO62/236294 does not generally compatible with the existing ordinary VTR systems. For example, discussed below is a case where stereoscopic pictures recorded on tape in a pattern as illustrated in FIG. 36 is to be reproduced in a prior art two-dimensional 8 mm VTR. This type of prior art 8 mm VTR, in tracking, utilizes crosstalk of a pilot signal from an adjacent track, and has its tracks of a head formed slightly wider than the standard track width (i.e., 20 to 23 µm) to compensate bend of the track and/or an error of the track width. If, in the 8 mm VTR, such a head is used to trace the pattern illustrated in FIG. 36, not only a track to be traced but a track of the same azimuth and adjacent to the same are simultaneously traced, and this results in abnormal reproduction of pictures. If tracking is deviated, the head of one azimuth can be prevented from tracing an adjacent portion of the same azimuth, but the head of the other azimuth will trace an adjacent track sharply.

In an 8 mm VTR having a head of which head width is 20 µm or under, although picture signals can be theoretically reproduced well if tracking is set in optimum position, actually there are various defects including bend of tracks and accuracy of tracking. Such a recording system requires existing 8 mm VTRs to have accuracy to such an extent as stated above and is not generally compatible with those ordinary VTRs.

Even if the prior art recording system has general compatibility with the existing VTRs, the difference signal must be limited in band and compressed on the time basis to ⅙, and pictures of sufficiently high quality cannot be obtained. Specifically, in the 8 mm VTRs, magnetic tape is wound on a rotational cylinder over an arc of its 226 deg. center angle; a 180 deg. section of the arc is used as a primary region where the primary signal is recorded while a 5 deg. section following the primary region is used as margin for the overlapping region. Although there still remains a 41 deg. section where the difference signal can be recorded, a region where the difference signal can be recorded is actually 30 to 35 deg. section since the remaining 41 deg. section must include margin to which a magnetic head is pushed against and margin which separates the primary signal from the difference signal. Thus, it is necessary, as stated above, that the difference signal is limited in band and compressed to ⅙ (in the event of 240 horizontal lines).

Restoring two picture signals from the difference signal compressed to some high extent, the resultant waveform is often distorted with one of the picture signal intermingled with the other picture signal, and there arises a problem that the picture signals can not be easily restored. Such a disadvantage will be described, referring to FIG. 37: FIG. 37A depicts a single horizontal scanning line extracted from each of a picture signal L for left eye and picture signal R for right eye input from a camera, and a difference signal "L–R". As shown in FIG. 37B, the picture signal R and a difference signal (L–R)' obtained by limiting in band the difference signal L–R are recorded on recording medium. In reproducing them, the picture signal R and the difference signal (L–R)' are reproduced, and the reproduced signal R and the reproduced difference signal (L–R)' are added to produce a picture signal L' for left eye. The picture signal L' for left eye assumes a distorted waveform due to intermingling components of the signal R with essential L components (shown by broken line), and it is hard to rightly restore pictures. Hence, it seems that ghostlike pictures are developed on the TV screen.

Moreover, in digital VTRs of the prior art, single channel picture data alone can be recorded, and none of those VTRs can record multi-channel picture data, that is, none of them can compress stereoscopic picture signals for left and right eyes and efficiently record them, and none of them have compatibility with prior art single channel digital VTRs so that one of multi-channels can be reproduced in the same format.

SUMMARY OF THE INVENTION

Accordingly, allowing for the above-mentioned circumstances, an object of the present invention is to provide a method of efficiently recording on the same recording medium a picture signal for either of left and right eyes and a difference signal of picture signals for left and right eyes, or at least two separate picture signals, keeping compatibility with existing apparatuses, and a method of reproducing from the recording medium at least two picture signals which are recorded in the above-mentioned method.

To attain this object, the present invention employs, in the event of recording a picture signal for left eye and a picture signal for right eye, a picture signal for one of right and left eyes limited in band by a low pass filter as being an additional signal and a picture signal for the other eye as being a primary signal, and the additional signal together with the primary signal are recorded on recording medium. Since the picture signal for one of right and left eyes limited in band by the low pass filter is recorded as the additional signal on the recording medium, producing a difference signal is needless, and degradation of the quality of pictures, namely, development of ghostlike pictures which are likely to occur due to reproduction based upon the difference signal can be prevented. Although the picture signal employed as the additional signal causes by itself deterioration of the resultant picture due to band limit and the like, it is possible that the picture produced by the picture signal along with the other picture signal having sufficient band makes audiences have stereoscopic visual impression.

Methods of recording an additional signal as mentioned above include a method of recording the additional signal in an overlapping region on an extension of a record track for a primary signal, a method of recording the additional signal in parallel with the record track for the primary signal at different azimuth angle, a method of recording the additional signal on a control track by using a fixed head, and a method of recording the additional signal by transforming the primary signal and additional signal so as to have frequency bands different from each other and multiplexing frequencies of those signals. Additionally, in digital VTRs, there may be employed a method of recording two signals on a single record track in the event that signals are not limited in band by a low pass filter (e.g., recording the primary signal and the difference signal, or recording utterly separate two picture signals), and a method, applicable to both digital and analog VTRs, of recording picture signals at recording speed twice as fast as usual.

Furthermore, the present invention provides an improvement of a method where a picture signal for one of left and right eyes is employed as being a primary signal, a difference signal is produced from the picture signal for one of left and right eyes and a picture signal for the other eye, and the difference signal is recorded in an overlapping region on an extension of a skew track for the primary signal. Specifically, the difference signal is recorded, ranging to a leading edge of the record track for the primary signal or beyond the leading edge (e.g., a position of margin to which a head is pushed against, or a position where a signal line not displayed on the screen is recorded). In this way, a record region for the difference signal is expanded, a ratio of compression on the difference signal is reduced, and eventually, the quality of the resultant picture can be enhanced. This method is also applied to the above mentioned case of recording the band limited signal on the recording medium.

The present invention also provides an improvement of a method where a picture signal for one of left and right eyes is employed as being a primary signal, a difference signal is produced from the picture signal for one of left and right eyes and a picture signal for the other eye, and the difference signal is recorded in parallel with a record track for the primary signal. In this improvement, tracks (b, c, and so forth) which are traced simultaneously with a specific track (a) are not equivalent in azimuth angle to the track (a). In this way, tracks equivalent in azimuth to a track to be essentially traced are no longer traced simultaneously, and reproduction can be performed in normal conditions.

Also, the present invention proposes a method different from the well known method of recording a signal in the overlapping region or recording a signal in parallel with the record track for the primary signal, that is, a method of recording the difference signal on a control track by using a fixed head, or a recording method where the primary signal and the difference signal are transformed in frequency bands different from each other and multiplexed in frequency.

The present invention further provides a method of recording at least two picture signals in a digital VTR, keeping compatibility with existing digital VTRs.

BRIEF DESCRIPTION OF THE DRAWINGS

Although preferred embodiments of the present invention will be described with reference to the accompanying drawings, the present invention should not be limited to the precise form of the described embodiments, but it widely covers the true scope of technical concepts of the present invention which will become apparent from the following detailed description in conjunction with the drawings; wherein

FIGS. 8A through 8D are diagrams illustrating a method of compressing an additional signal;

FIG. 11 is a timing chart illustrating contents of a signal recorded in magnetic tape wound on a rotational cylinder over an arc corresponding to its 226 deg. center angle;

FIGS. 12A through 12D are diagrams illustrating a method of compressing a difference signal;

FIG. 24 is a model view showing a recording format on magnetic tape in a picture signal recording method of a variation of the fifth preferred embodiment of the present invention;

DESCRIPTION OF THE PREFERRED EMBODIMENTS

A first preferred embodiment of the present invention will now be described with reference to FIG. 1 to FIG. 8.

Figure 1:
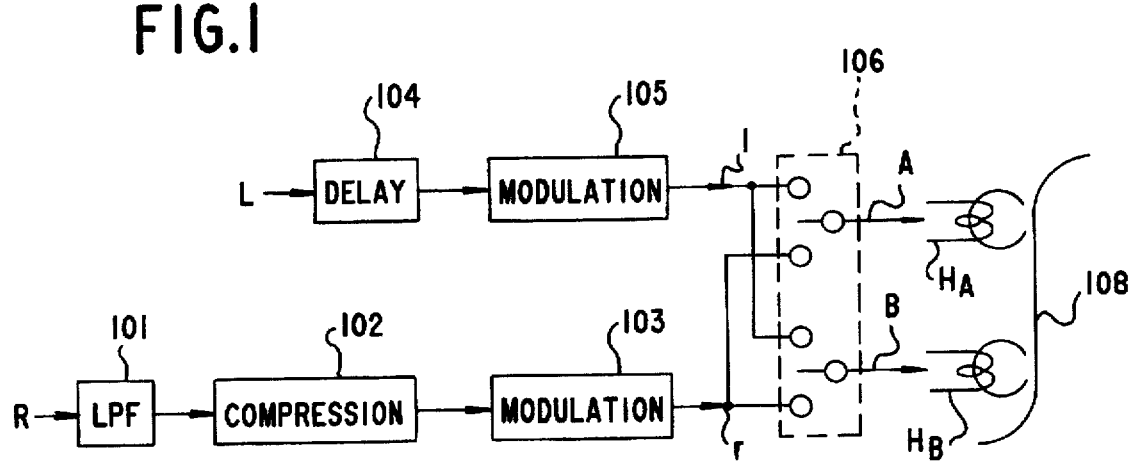
FIG. 1 is a schematic block diagram showing a system architecture of a VTR in which a stereoscopic picture recording method according to a first preferred embodiment of the present invention is implemented.

FIG. 1 is a schematic block diagram showing a system architecture of a video tape recorder (referred to as "VTR" hereinafter) where a method of recording stereoscopic pictures according to the present invention is implemented. The VTR of the present invention employs a picture record method where picture signals are recorded on magnetic tape 108 in the helical scan system; specifically, the magnetic tape 108 is wound on a rotational cylinder (not shown) over an arc corresponding to 180 deg. or over of its center angle to record a compressed additional signal "r" on an extension of a record track for a primary signal "l" recorded in a section equivalent to the arc; that is, in an existing two-dimensional VTR or 8 mm VTR, the additional signal r is recorded in an overlapping region of magnetic tape (i.e., in a region where an optional PCM signal is recorded in such an 8 mm VTR).

A picture signal R for right eye, after it passes through a low-pass filter (LPF) 101 and is limited in band, is compressed by a compression circuit 102 and is further modulated into a signal suitable to be magnetically recorded by a modulation circuit 103. The signal which has undergone band limit, compression and modulation is treated as the additional signal r.

A picture signal L for left eye is applied to a delay circuit 104 without undergoing band limit and is delayed by the delay circuit 104 to match in time to the picture signal R. After that, the signal is further modulated into a signal suitable to be magnetically recorded by a modulation circuit 105. The signal which is not limited in band but modulated is treated as the primary signal l. Although the picture signal L for left eye may be limited in band after passing through the LPF to eliminate high frequency components equivalent to noise, cutoff frequency of an LPF used for the picture signal L is, in such a case, to be set higher than cutoff frequency of the above-mentioned LPF 101.

A switch 106 switches signal transmission between the additional signal r and the primary signal l, and the switch 106 is utilized to discriminatingly produce record signals A and B. The record signals A and B are respectively recorded on the magnetic tape 108 by magnetic heads Ha and Hb.

Figure 2:
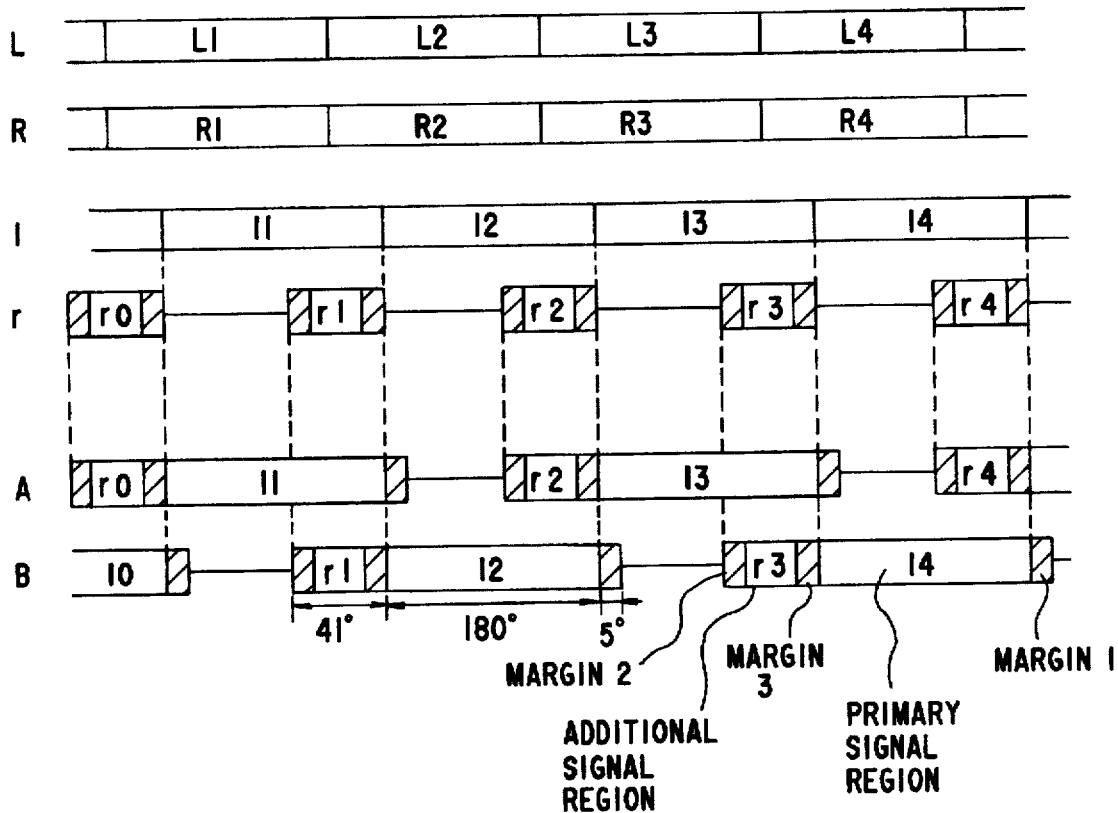
FIG. 2 is a timing chart illustrating contents of signals processed by components in the above block diagram of FIG. 1 and correlations among those signals.

FIG. 2 is a timing chart illustrating contents of the picture signals L and R, the primary signal l, the additional signal r and the record signals A and B and correlations among those signals.

In the 8 mm VTR, magnetic tape is wound over a 226 deg. arc on a rotational cylinder, and a 180 deg. section in the whole arc is partially used as a primary region (i.e., a region where the primary signal 1 is recorded). There is a 5 deg. section following the primary region, which is used as margin (margin 1) to the overlapping region. While there still remains a 41 deg. section leading the primary region as a region where the additional signal r can be recorded, a region where practically the additional signal r can be recorded is an approximately 30 deg. to 35 deg. section (see the record signals A and B in FIG. 2) since margin against which the magnetic heads are pushed (margin 2) and margin which separates the primary signal 1 from the additional signal r (to prevent the additional signal r from exerting some influence upon the primary signal 1 due to errors of a switching position by the switch 6 and/or jitter) must be assured.

Thus, it is necessary to compress the additional signal r to about ⅕ to ⅙ of its original width. If a band of the additional signal r recordable in the VTR is 4 MHz, for example, band limit is carried out in a range from 0.6 MHz to 0.8 MHz.

A procedure will now be discussed in which stereoscopic pictures are reproduced from magnetic tape loaded with the stereoscopic picture signals as previously mentioned. This reproducing procedure, similar to the recording procedure, employs the helical scan system where the magnetic tape is wound on the rotational cylinder over an arc corresponding to 180 deg. or over of its center angle to reproduce the primary signal 1 from a region of the 180 deg. arc and the additional signal r from the overlapping region in due reproducing course reverse to the course in recording as depicted in FIG. 1. A picture for right eye derived from the additional signal r and a picture for left eye derived from the primary signal 1 are reproduced separate from each other; and the picture based upon the additional signal r is displayed on a screen with low resolution due to the band limit. Thus, unlike the prior art, it is needless adding a difference signal to a picture signal for either of eyes.

Figure 3:
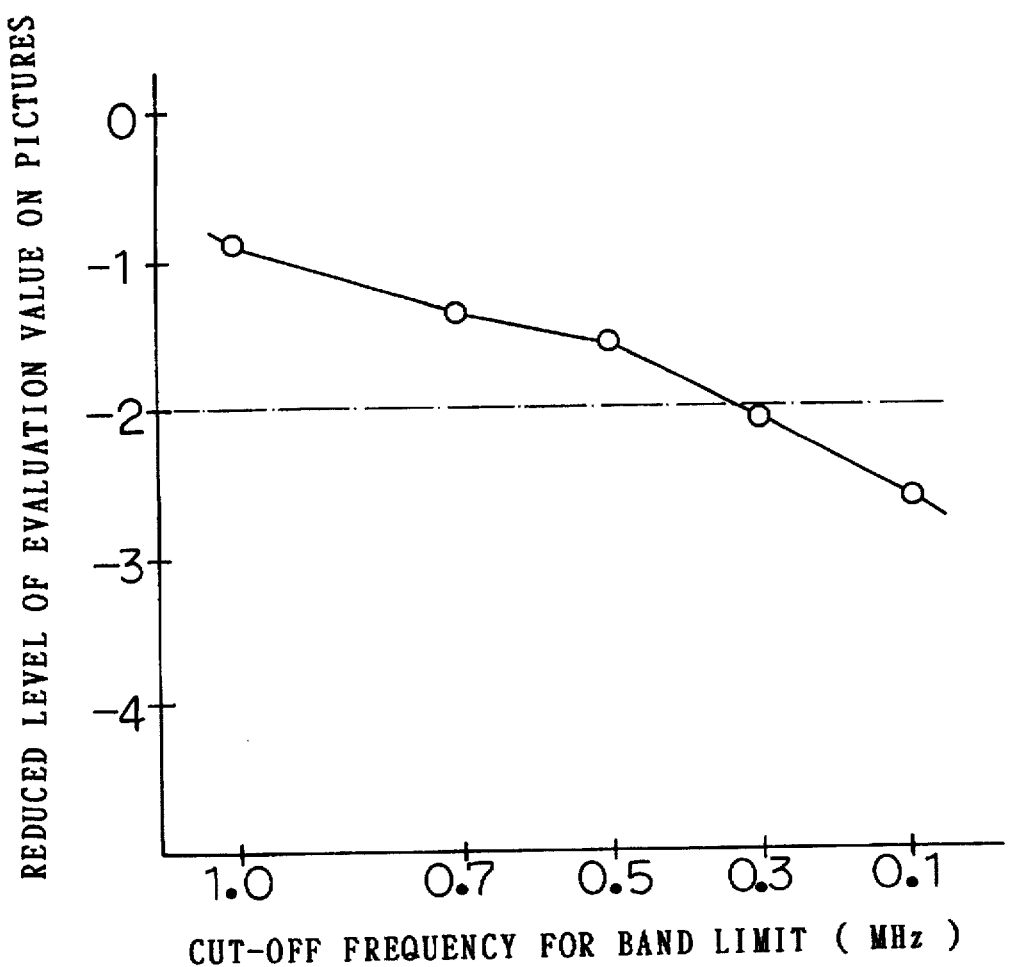
FIG. 3 is a graph representing reduction of an evaluation value upon original pictures in the event of reproducing according to the method of this invention stereoscopic pictures recorded by means of a first preferred embodiment of the present invention, in relation with cutoff frequency in band limit.
Figure 4:
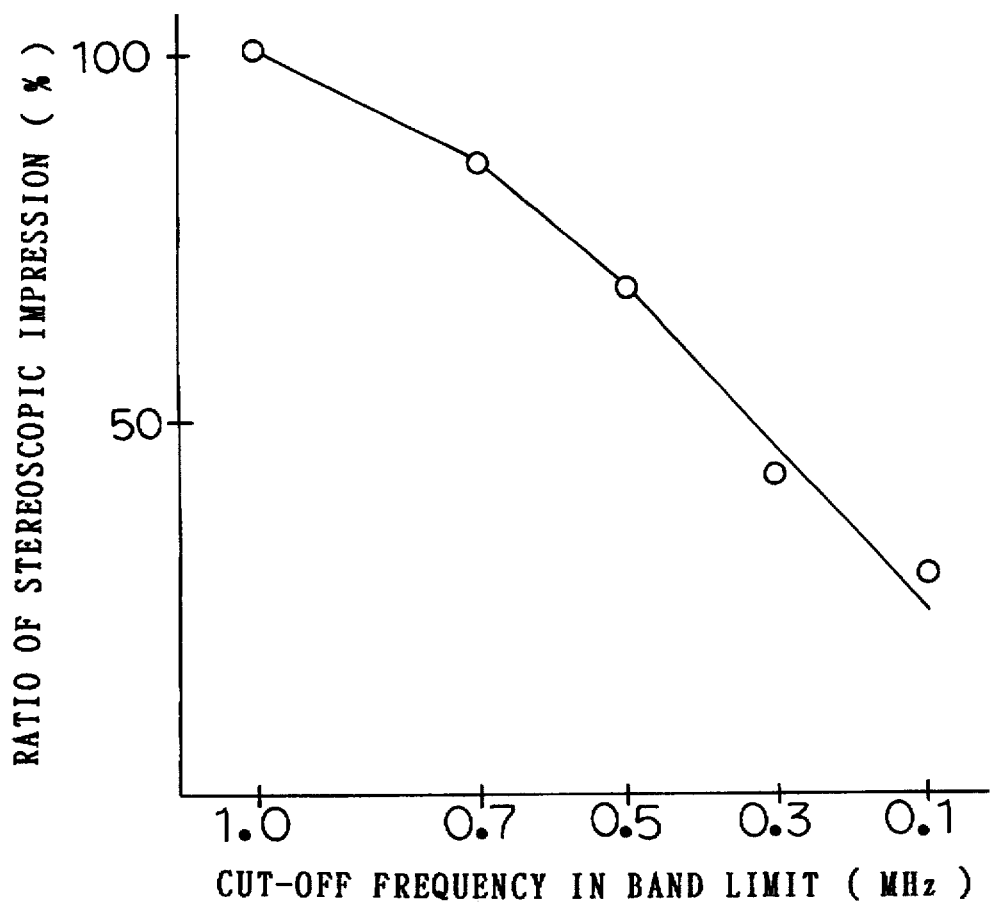
FIG. 4 is a graph representing a ratio of having stereoscopic visual impression in the event of reproducing according to the method of this invention stereoscopic pictures recorded by means of the first preferred embodiment of the present invention.

Evaluation of stereoscopic pictures reproduced as previously mentioned will be described below. FIG. 3 illustrates a result of the evaluation on the quality of the pictures while FIG. 4 is a graph representing ratios at which observers are visually impressed that the pictures are stereoscopic. In such an evaluation, there are twelve of the observers of an evaluation trial, and a subjective judgment by means of double successive stimulation is employed. The pictures are graded by quality from the first to the fifth, and they are also evaluated by visual stereoscopic impression of by means of alternative judgment between YES and NO. Two sorts of stereoscopic pictures are examined herein.

A graph in FIG. 3 is to be analyzed as follows. If the cutoff frequency in the band limit is 1.0 MHz, a reduced level of an evaluation value in the case without the band limit is 1 or lower, and this means almost no degradation of the quality of the pictures is observed. In a range of the cutoff frequency in the band limit from 1.0 MHz to 5 MHz, the reduced level of the evaluation value ranges from 1 to 2, there is no problem in practical use. On the other hand, the reduced level of the evaluation value is 2 or over with the band limit down to 0.3 MHz, and this is impractical.

A graph in FIG. 4 is to be analyzed as follows. If the band limit is set to 0.5 MHz or over, 70 or higher percent of the observers are impressed that the pictures are stereoscopic, and therefore, the pictures are roughly satisfactory as stereoscopic pictures.

Allowing for a band limit quantity determined by the correlation between the quality of the pictures and the reduced level of the stereoscopic impression upon the pictures, that which takes the cutoff frequency ranging from 0.5 to 1.0 MHz can be used as the LPF 101.

In the case where stereoscopic picture signals recorded on the magnetic tape as previously mentioned are reproduced to two-dimensional pictures in any existing two-dimensional VTR, since the primary signal 1 is recorded according to an existing format, it can be reproduced without problem.

Then, a variation of the above embodiment will now be described. Like reference numerals denote corresponding components in FIGS. 1 and 5, and explanation about those components is omitted for simplification of the following discussion.

Figure 5:
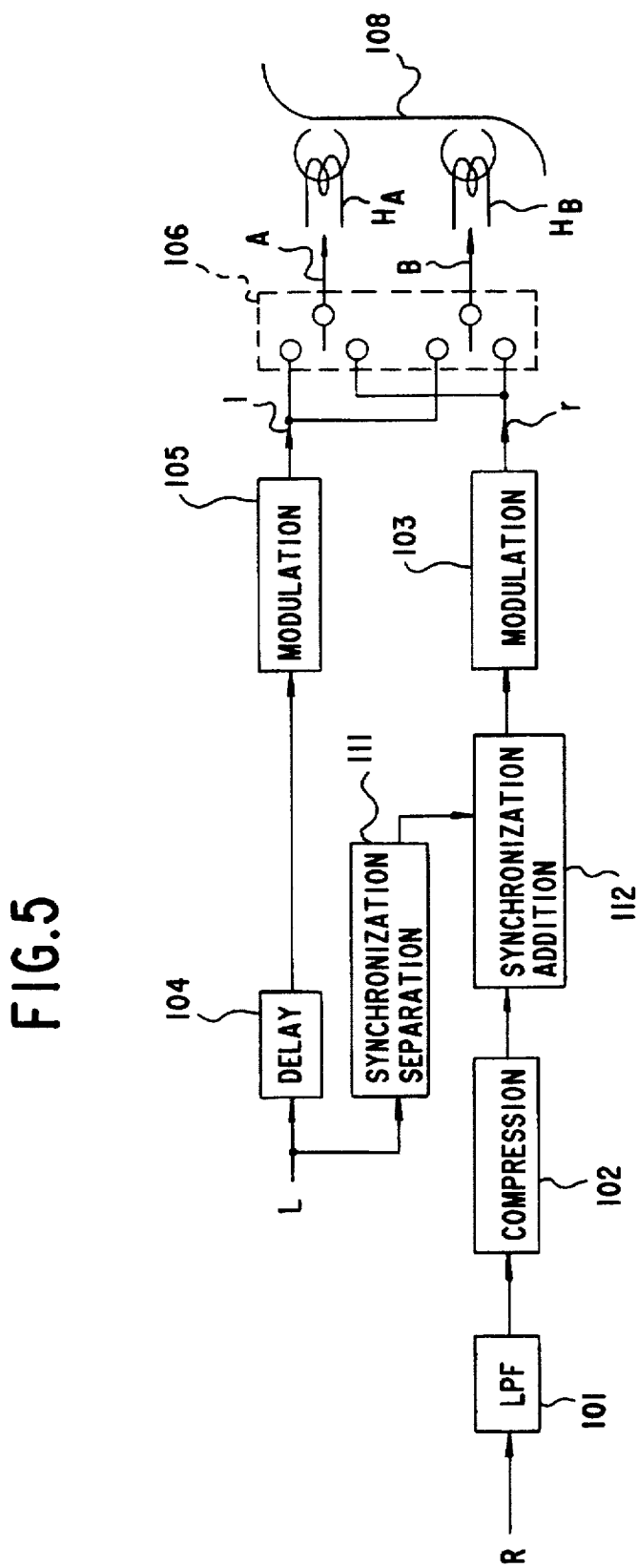
FIG. 5 is a schematic block diagram showing a system architecture of a VTR in which an improvement of the method of the first preferred embodiment of the present invention is implemented.

FIG. 5 is a schematic block diagram showing a system architecture of a video tape recorder (hereinafter referred to as "VTR") in which a method of recording stereoscopic pictures in accordance with a variation of the present invention is implemented. The VTR of this embodiment employs a picture record method where picture signals are recorded on magnetic tape 108 in the helical scan system; specifically, the magnetic tape 108 is wound on a rotational cylinder (not shown) over an arc corresponding to 180 deg. or over of its center angle to record a compressed additional signal r on an extension of a record track for a primary signal 1 recorded in a section equivalent to the arc.

This embodiment differs from the previous embodiment in that the VTR includes a synchronization separating circuit 111 for separating a synchronization signal from a picture signal L for left eye and a synchronization adding circuit 112 for adding the synchronization signal to a picture signal R for right eye. These circuits cooperatively work with other components so that after the synchronization signal equivalent in cycle and phase to the picture signal L is added to the compressed picture signal R, the resultant signal is modulated to produce the additional signal r. Eventually, the additional signal r carrying the synchronization signal equivalent in cycle and phase to a horizontal synchronization signal for the primary signal 1 is produced.

Figure 6:
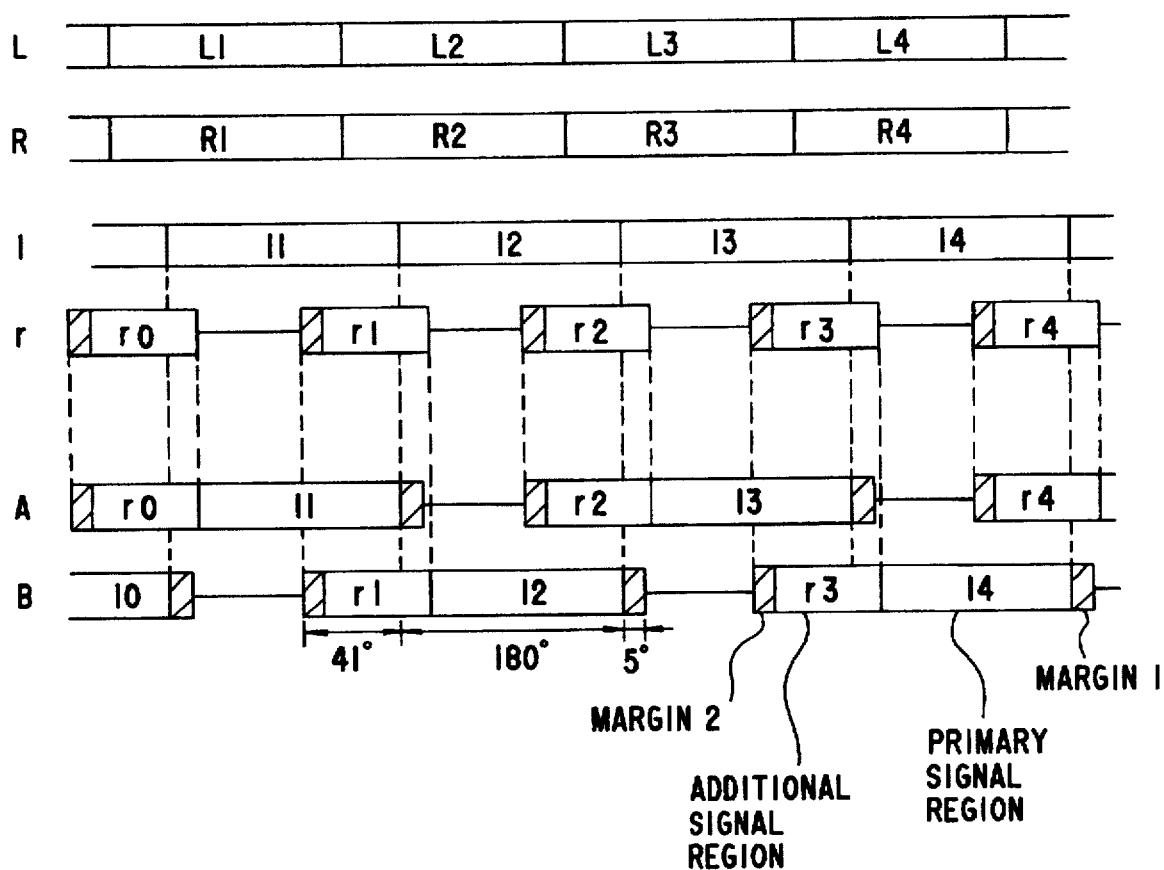
FIG. 6 is a timing chart illustrating contents of signals processed by components in the block diagram of FIG. 5 and correlations among those signals.

FIG. 6 is a timing chart illustrating contents of the picture signals L and R, the primary signal 1, the additional signal r and the record signals A and B and correlations among those signals. As will be recognized in this chart, a region where the additional signal r is to be recorded is larger than that in the previous embodiment. Specifically, the additional signal r is recorded in a range which is greater than its essential region and which leads a track storing the primary signal 1. In FIG. 6, the region loaded with the additional signal r extends just before a vertical synchronization signal position in the region where the primary signal 1 is recorded.

Figures 7A, 7B, 7C, 7D:
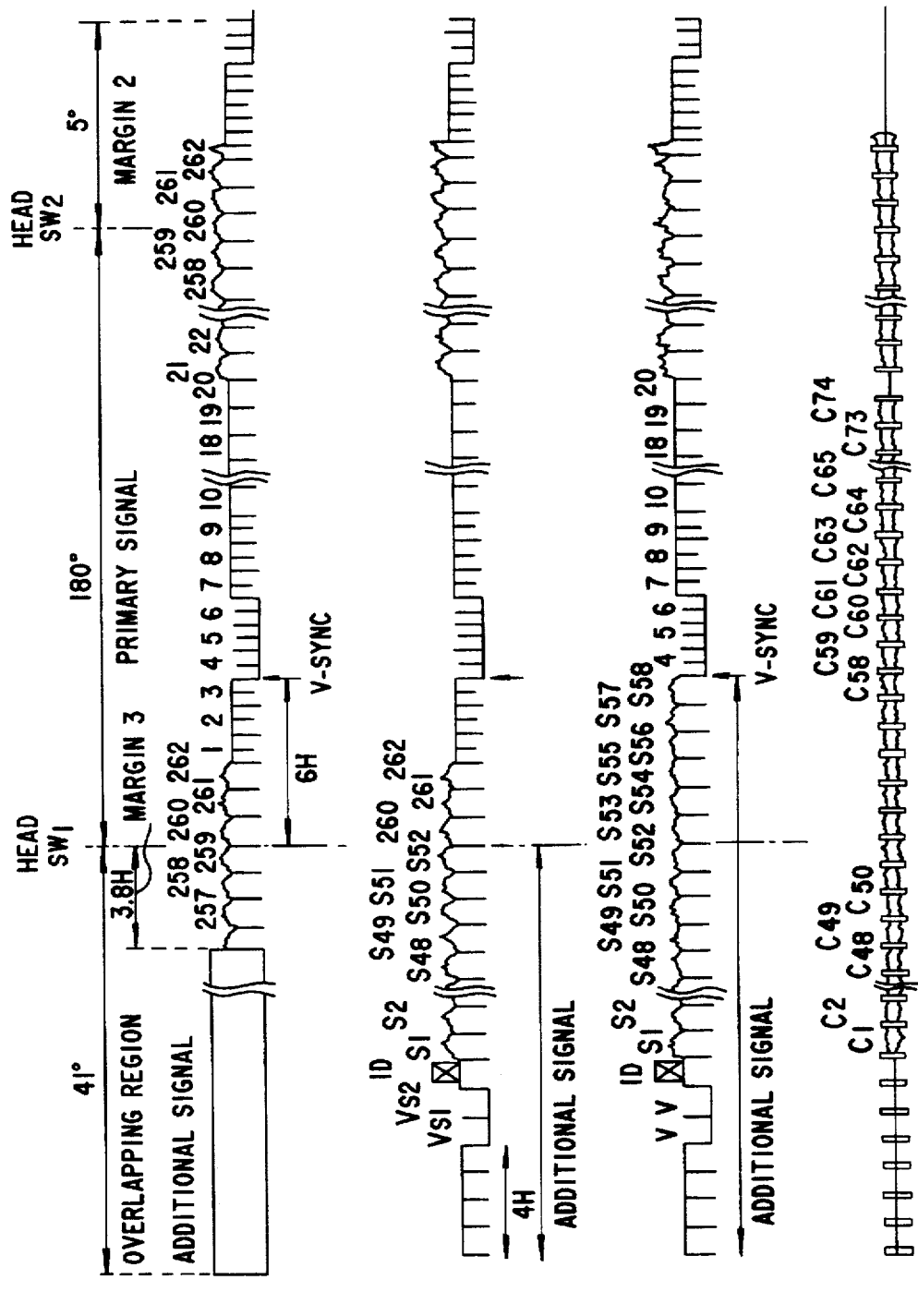
FIG. 7 is a timing chart illustrating contents of a signal recorded in magnetic tape wound on a rotational cylinder over an arc corresponding to its 226 deg. center angle.

FIG. 7 depicts contents of a signal recorded in a section equivalent to a 226 deg. arc of the rotational cylinder over which the magnetic tape is wound, and FIG. 7(c) corresponds to FIG. 6. The additional signal r in the overlapping region carries a horizontal synchronization signal contiguous to the primary signal 1, where there lie a 4H horizontal scan period as margin (margin 2) at a leading portion to which a head is pushed against, a 2H period as vertical synchronization signals (VS1 and VS2) for the additional signal r, and a 1H period as an ID signal (which stores an identification signal for identifying a way of compression, a ratio of the compression, discrimination between L and R, and so forth), and after that, there comes a 58H effective picture signal period just before a position of a vertical synchronization signal (VSYNC) for the primary signal 1.

In such a recording method, an effective picture signal (240H) of the picture signal R for right eye may be recorded during the 58H period. Thus, the ratio of the compression of pictures can be reduced to about ¼, and the quality of the picture can be enhanced. Although part of the primary signal l are replaced with the additional signal r, no problem arises in reproducing the primary signal l since the additional signal r is equivalent in cycle and phase to a horizontal synchronization signal for the primary signal l and contiguous to the same. Surely two-dimensional pictures can be reproduced in normal conditions in an ordinary two-dimensional VTR, and thus, compatibility is assured.

FIG. 7(d) depicts a color signal pattern in the case where luminance signal components (not shown) of the additional signal r are recorded from an initial end of an additional region to immediately before the position of the vertical synchronization signal of the primary signal l while color signal components of the additional signal r are recorded to a position corresponding to a vertical blanking period containing the vertical synchronization signal. A color signal in the overlapping region carries a horizontal synchronization signal contiguous to the primary signal l; where there lies a 7H burst signal for leading in AFC of color burst at a leading portion, and after that, there comes a 74H signal period of an effective picture signal of the color signal just before an effective picture period of the primary signal l.

In such a way of recording, an effective picture signal (240H) of the picture signal R for right eye may be recorded during the 74H period. Thus, the ratio of the compression of the picture can be reduced to about ⅓, and the quality of the picture can be enhanced. In reproducing the primary signal l, the color signal of the additional signal r is reproduced from a switching position (marked with SW1 in FIG. 7) to just before the effective picture period, and no problem arises because this part never appear on a TV screen. Additionally, synchronization never be disturbed since horizontal synchronization keeps continuous.

FIG. 7(b) depicts a case where a record region for the additional signal r ranges just before a region where the primary signal l is recorded. Specifically, the additional signal r in the overlapping region carries a horizontal synchronization signal contiguous to the primary signal l, where there lie a 4H horizontal scanning period at its leading portion as margin to which the head is pushed against, a 2H period of vertical synchronization signals (VS1 and VS2) for the additional signal r, and a 1H as an ID signal, and after that, there comes a 48H period of an effective picture signal. In such a case, regions which are once used as margins can work as additional signal regions; that is, a region where the additional signal r is recorded can be expanded by those margins to reduce the ratio of the compression.

FIG. 7(a) shows the first exemplary record pattern in the above first preferred embodiment, presented herein for comparison with FIGS. 7(b) to (d). In this pattern, the additional signal r recorded in the overlapping region is put at a leading portion of a track while the primary signal lies a 180 deg. period between two head switches. Between the additional signal r and the primary signal l, a 3.8H period is occupied as margin. A vertical synchronization signal for the primary signal l is recorded 6H after a position of the head switch (head SW). In reproducing the primary signal l, switching at the head SW position the primary signal l to that of the following track results in continuous picture signals.

Then, a method of compressing the additional signal r will be described with reference to FIG. 8.

FIG. 8A illustrates a method of compressing on the time basis a signal for an effective picture period of five horizontal scanning lines of the input picture signal R within an effective picture period of a single horizontal scanning line of the additional signal r. Specifically, the effective picture period is compressed to 1/L in L (an integer) lines of effective picture scanning lines on the time basis and multiplexed on the time-division basis within a single horizontal scanning line period to produce the additional signal r. In FIG. 8, the illustration is based on L=5. In such a case, although a frequency band of a picture signal is degraded to ⅕ to the input picture signal R, all scanning lines of the input picture signal R can be recorded.

FIG. 8B illustrates a method of recording the picture signal R by dividing scanning lines constituting a single field of the input picture signal R into five groups to make additional signal regions of five field periods. More specifically, a single field of signal is taken out every M (an integer) fields of the input picture signal, and the scanning lines in the single field are divided into M groups, so that the M groups of the scanning lines may constitute M fields of the additional signal r. In FIG. 8B, the illustration is based upon M=5. In such a case, a first field of pictures are perfectly recorded, but second to fifth fields of pictures are not recorded. In other words, one out of five fields of pictures are recorded, and this is effective in stationary pictures or pictures relatively less mobile.

FIG. 8C illustrates a method of recording the picture signal R by dividing scanning lines constituting a single frame of the input picture signal R into eight groups to make additional signal regions of eight field periods. Specifically, a single frame of signal is taken out every N (an integer/2) frames of the input picture signal, and the single frame of the scanning lines are divided into 2N groups, so that the 2N groups of the scanning lines constitute 2N fields of the additional signal r. In FIG. 8C, the illustration is based upon N=4. In such a case, pictures of a first frame are perfectly recorded while those in second to fifth frames are not recorded. In other words, pictures in one out of four frames are recorded, and this is effective to stationary pictures or pictures relatively less mobile.

Referring to FIG. 8D, scanning lines in each of even numbered fields and odd numbered fields of the input picture signal R are divided into four groups. Then, one of the four groups of the scanning lines is employed, and in this situation, a group of the scanning lines next to the group of the scanning lines employed in the previous field are employed in the following field. In other words, the scanning lines of each of the even and odd numbered fields are divided into K (an integer) groups, and one out of the K groups is sequentially selected in order every field, so that the scanning lines selected in this way are taken out of the input picture signal to produce the additional signal. In FIG. 8D, the illustration is based upon K=4. In such a case, the resolution of mobile pictures is vertically deteriorated, but this method is effective upon stationary pictures or pictures less mobile.

The above numerical values K to N are mere examples, and they should not be recognized as being restrictive.

It is also possible to perform the compression in some combination of the above methods illustrated in FIGS. 8A to 8D.

For example, assuming M=2 or 3 in the method of FIG. 8B, N=1.5 to 3 in the method of FIG. 8C, or K=2 or 3 in the method of FIG. 8D, after the scanning lines of the picture signal produced in any of these methods are taken out, multiplexing on the time basis may be performed with L=2 or 3 to produce the additional signal r. This is an intermediate compression method between the compression methods illustrated in FIGS. 8B to 8D and the method illustrated in FIG. 8A, and it brings about a further advanced compression effective upon mobile pictures.

Only one of the compression methods as previously discussed may be employed, or otherwise, some of them may be appropriately used to produce the additional signal r. For example, one of the above compression methods may be selected in accordance with a mode manually selected in advance; or otherwise, after an amount of movement of the stereoscopic signal is detected, a compression method may be selected from those as illustrated in FIG. 8B to 8D if the amount of the movement is small or selected from those as illustrated in FIG. 8A if the amount of the movement is large.

Although this embodiment presents a method of recording the additional signal r in the overlapping region while the magnetic tape is wound on the rotational cylinder over its 180 deg. arc, the additional signal r may be recorded in a narrower width than and in parallel with a record track for the primary signal 1 simultaneous with the same. In such a case, compressing the additional signal r is not particularly necessary, and the switch 106 in FIG. 1 or FIG. 5 is needless. Also, in this case, an azimuth angle of the magnetic head for recording the additional signal r may be reversed in positive/ negative relation to that of the magnetic head for recording the primary signal 1, and both of the magnetic heads may be integrated with each other.

Although, in the illustration of the above-mentioned embodiments, the magnetic tape is employed as recording medium, other recording medium including optical disk may be used.

As has been described, in the first preferred embodiment and its variation, production of a difference signal is no longer needed unlike the prior art embodiments, and degradation of the quality of pictures, that is, production of ghostlike deteriorated pictures which is likely to arise in reproduction based upon the difference signal can be prevented. Although a picture signal for one of right and left eyes working as the additional signal leads of itself to a conspicuously deteriorated picture, such a deteriorated picture together with a picture based upon a picture signal for the other eye with a sufficient band enable audiences to have stereoscopic visual impression. Moreover, these embodiments have an effect of assuring compatibility with any existing two-dimensional VTR.

A second preferred embodiment according to the present invention will be described with reference to FIG. 9 to FIG. 12. While, in the first preferred embodiment, a band limited signal is recorded as the additional signal recorded along with the primary signal, a difference signal is recorded as an additional signal recorded along with a primary signal of a picture signal for either of left and right eyes in this embodiment.

Figure 9:
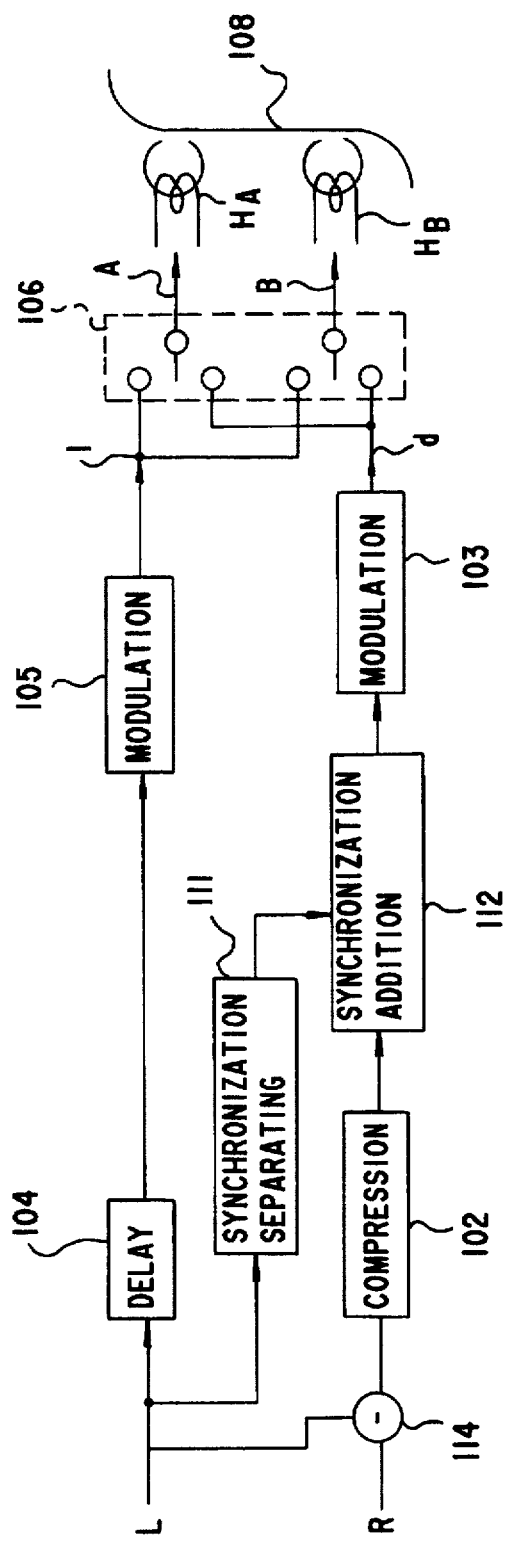
FIG. 9 is a schematic block diagram showing a system architecture of a recording portion of a VTR where a picture signal recording method of a second preferred embodiment of the present invention is implemented.

FIG. 9 is a schematic block diagram showing a system architecture of a video tape recorder (hereinafter referred to as "VTR") in which a method of recording stereoscopic pictures in accordance with the second preferred embodiment of the present invention is implemented. This VTR employs a picture recording method of recording picture signals on magnetic tape 108 by means of the helical scan system; where the magnetic tape 108 is wound on a rotational cylinder (not shown) over an arc corresponding to its 180 deg. or over center angle to record a compressed difference signal d on an extension of a record track for a primary signal 1 which is recorded in such a 180 deg. section. In other words, the difference signal d is recorded in an overlapping region of the magnetic tape (i.e., a region where an optional PCM signal is recorded in an 8 mm VTR) in an existing two-dimensional VTR or 8 mm VTR.

A picture signal R for right eye and a picture signal L for left eye passes through a subtraction circuit 114 to undergo a subtraction, and the resultant signal is compressed by a compression circuit 102 and further modulated into a signal suitable to magnetic record by a modulation circuit 103, and in this way the difference signal d is produced.

The picture signal L for left eye is delayed by a delay circuit 104 to match in time and is further modulated into a signal suitable to magnetic record by a modulation circuit 105, and in this way a primary signal 1 is produced.

A synchronization separating circuit 111 in FIG. 9 separates a synchronization signal from the picture signal L for left eye, and the synchronization signal separated by the synchronization separating circuit 111 is added to a difference signal by a synchronization adding circuit 112. After the synchronization signal equivalent in cycle and phase to the picture signal L for left eye is added to the difference signal, the resultant signal is modulated, and in this way, the difference signal d is produced by both the above circuits. Thus, the difference signal d equivalent in cycle and phase to a horizontal synchronization signal for the primary signal 1 is produced.

A switch 106 switches signal transmission between the difference signal d and the primary signal 1, and the switch 106 is utilized to discriminatingly produce record signals A and B. The record signals A and B are respectively recorded on the magnetic tape 108 by magnetic heads Ha and Hb.

Figure 10:
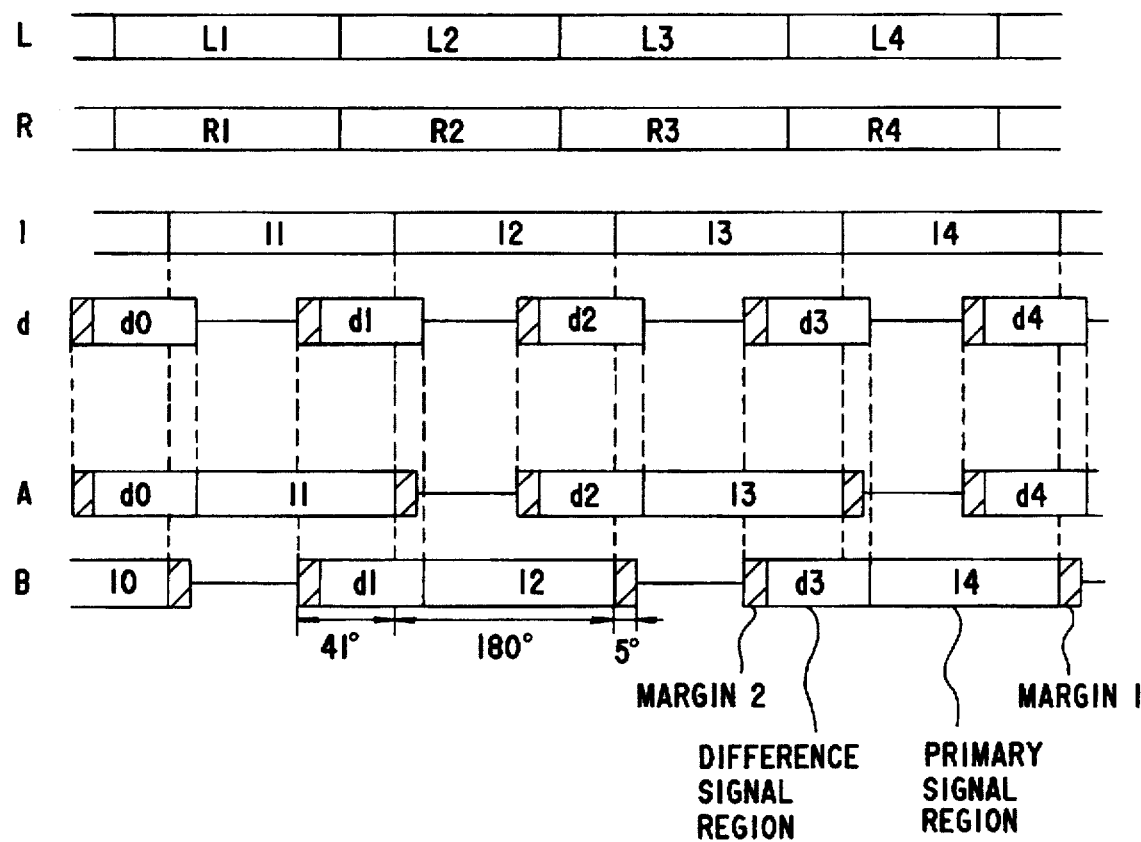
FIG. 10 is a timing chart illustrating contents of signals processed by components in the block diagram of FIG. 9 and correlations among those signals.

FIG. 10 is a timing chart illustrating contents of the picture signals L and R, the primary signal 1, the difference signal d and the record signals A and B and correlations among those signals. As will be recognized in FIG. 10, a record region for the difference signal d is larger than its essential record region (30 to 35 deg. section). More specifically, the difference signal d is recorded at a leading portion of a record track for the primary signal 1 in a range greater than the essential record region of the difference signal d. In FIG. 10, the record region for the difference signal d ranges just before a position of a vertical synchronization signal in the region where the primary signal 1 is recorded.

FIG. 11 depicts contents of a signal recorded in a section equivalent to a 226 deg. arc of the rotational cylinder over which the magnetic tape is wound, and FIG. 11(c) corresponds to FIG. 10. The difference signal d in the overlapping region carries a horizontal synchronization signal contiguous to the primary signal 1, where there lie a 4H horizontal scan period as margin (margin 2) at a leading portion to which a head is pushed against, a 2H period as vertical synchronization signals (VS1 and VS2) for the difference signal d, and a 1H period as an ID signal (which stores an identification signal for identifying a way of compression, a ratio of the compression, discrimination between L and R, and so forth), and after that, there comes a 58H effective picture signal period just before a position of a vertical synchronization signal (VSYNC) for the primary signal 1.

In such a recording method, an effective picture signal (240H) of the picture signal R for right eye may be recorded during the 58H period. Thus, the ratio of the compression of pictures can be reduced to about ¼, and the quality of the pictures can be enhanced. Although part of the primary signal 1 are replaced with the difference signal d, no problem arises in reproducing the primary signal 1 since the difference signal d is equivalent in cycle and phase to a horizontal synchronization signal for the primary signal 1 and contiguous to the primary signal 1. Surely two dimensional pictures can be reproduced in normal conditions in an ordinary two-dimensional VTR, and thus, compatibility is assured.

FIG. 11(d) depicts a color signal pattern in the case where luminance signal components (not shown) of the difference signal d are, similar to the above case, recorded from an initial end of an additional region to immediately before the position of the vertical synchronization signal for the primary signal 1 while color signal components of the difference signal d are recorded to a position corresponding to a vertical blanking period containing the vertical synchronization signal. A color signal in the overlapping region carries a horizontal synchronization signal contiguous to the primary signal 1; where there lies a 7H burst signal for leading in AFC of color burst at a leading portion, and after that, there comes a 74H signal period of an effective picture signal of the color signal just before an effective picture period of the primary signal 1.

In such a method of recording, an effective picture signal (240H) of the picture signal R for right eye may be recorded during the 74H period. Thus, the ratio of the compression of the picture can be reduced to about ⅓, and the quality of the picture can be enhanced. In reproducing the primary signal 1, the color signal of the difference signal d is reproduced from a switching position (marked with SW1 in FIG. 11) to just before the effective picture period, and no problem arises because this part never appear on a TV screen. Additionally, synchronization never be disturbed since horizontal synchronization keeps continuous. FIG. 11(b) depicts a case where a record region for the difference signal d ranges just before a region where the primary signal 1 is recorded. Specifically, the difference signal d in the overlapping region carries a horizontal synchronization signal contiguous to the primary signal 1, where there lie a 4H horizontal scanning period at its leading portion as margin to which the head is pushed against, a 2H period of vertical synchronization signals (VS1 and VS2) for the difference signal d, and a 1H as an ID signal, and after that, there comes a 48H period of an effective picture signal. In such a case, regions which are once used as margins can work as difference signal regions; that is, a region where the difference signal d is recorded can be expanded by those margins to reduce the ratio of the compression.

FIG. 11(a) shows a record pattern in the prior art for comparison with FIGS. 11(b) to 11(d). In this pattern, the difference signal d recorded in the overlapping region lies at a leading portion of a track while the primary signal 1 lies in a 180 deg. section between the two head switches. Between the difference signal d and the primary signal 1, a 3.8H period is occupied as margin. A vertical synchronization signal for the primary signal 1 is recorded 6H after a position of a head switch (head SW1). In reproducing the primary signal 1, the head SW1 is utilized to switch the signal to the primary signal 1 to obtain picture signals which keep continuous.

The method of compressing the difference signal d will be discussed with reference to FIG. 12.

FIG. 12A illustrates a method of compressing on the time basis a signal for an effective picture period of five horizontal scanning lines of the input picture signal R within an effective picture period of a single horizontal scanning line of the difference signal d. Specifically, the effective picture period is compressed to 1/L in L (an integer) lines of effective picture scanning lines on the time basis and multiplexed on the time-division basis within a single horizontal scanning line period to produce the difference signal d. In FIG. 12, the illustration is based on L=5. In such a case, although a frequency band of a picture signal is degraded to ⅕ to the input picture signal R, all scanning lines of the input picture signal R can be recorded.

FIG. 12B illustrates a method of recording the picture signal R by dividing scanning lines constituting a single field of the input picture signal R into five groups to make difference signal regions of five field periods. More specifically, a single field of signal is taken out every M (an integer) fields of the input picture signal, and the scanning lines in the single field are divided into M groups, so that the M groups of the scanning lines may constitute M fields of the difference signal d. In FIG. 12B, the illustration is based upon M=5. In such a case, a first field of pictures are perfectly recorded, but second to fifth fields of pictures are not recorded. In other words, one out of five fields of pictures are recorded, and this is effective in stationary pictures or pictures relatively less mobile.

FIG. 12C illustrates a method of recording the input picture signal R by dividing scanning lines constituting a single frame of the input picture signal R into eight groups to make difference signal regions of eight field periods. Specifically, a single frame of signal is taken out every N (an integer/2) frames of the input picture signal, and the single frame of the scanning lines are divided into 2N groups, so that the 2N groups of the scanning lines constitute 2N fields of the difference signal d. In FIG. 12C, the illustration is based upon N=4. In such a case, pictures of a first frame are perfectly recorded while those in second to fifth frames are not recorded. In other words, pictures in one out of four frames are recorded, and this is effective to stationary pictures or pictures relatively less mobile.

Referring to FIG. 12D, scanning lines in each of even numbered fields and odd numbered fields of the input picture signal R are divided into four groups. Then, one of the four groups of the scanning lines in each field are employed, and in this situation, a group of the scanning lines next to the group of the scanning lines employed in the previous field are employed in the following field. In other words, the scanning lines of each of the even and odd numbered fields are divided into K (an integer) groups, and one out of the K groups is sequentially selected in order every field, so that the scanning lines selected in this way are taken out of the input picture signal to produce the difference signal. In FIG. 12D, the illustration is based upon K=4. In such a case, the resolution of mobile pictures is vertically deteriorated, but this method is effective upon stationary pictures or pictures less mobile.

The above numerical values K to N are mere examples, and they should not be recognized as being restrictive.

It is also possible to perform the compression in some combination of the above methods illustrated in FIGS. 12A to 12D.

For example, assuming M=2 or 3 in the method of FIG. 12B, N=1.5 to 3 in the method of FIG. 12C, or K=2 or 3 in the method of FIG. 12D, after the scanning lines of the picture signal produced in any of these methods are taken out, multiplexing on the time basis may be performed with L=2 or 3 to produce the difference signal d. This is an intermediate compression method between the compression methods illustrated in FIGS. 12B to 12D and the method illustrated in FIG. 12A, and it brings about a further advanced compression effective upon mobile pictures.

Only one of the compression methods as previously discussed may be employed, or otherwise, some of them may be appropriately used to produce the difference signal d. For example, one of the above compression methods may be selected in accordance with a mode manually selected in advance; or otherwise, after an amount of movement of the stereoscopic picture signal is detected, a compression method may be selected from those as illustrated in FIG. 12B to 12D if the amount of the movement is small or selected from those as illustrated in FIG. 12A if the amount of the movement is large.

As has been described, in accordance with the second preferred embodiment of the present invention, a region where the difference signal is recorded is occupied as large as possible while a recording format in any existing two-dimensional VTR is retained so as to reduce the ratio of the compression of the difference signal, and eventually, pictures of good quality can be obtained.

A third preferred embodiment according to the present invention will be described in detail with reference to FIGS. 13 to 15. In this embodiment, the additional signal is recorded in a region other than a region where the primary signal is recorded and a region where the vertical synchronization signal is recorded. A case where the difference signal is used as the additional signal will be discussed below.

Figure 13:
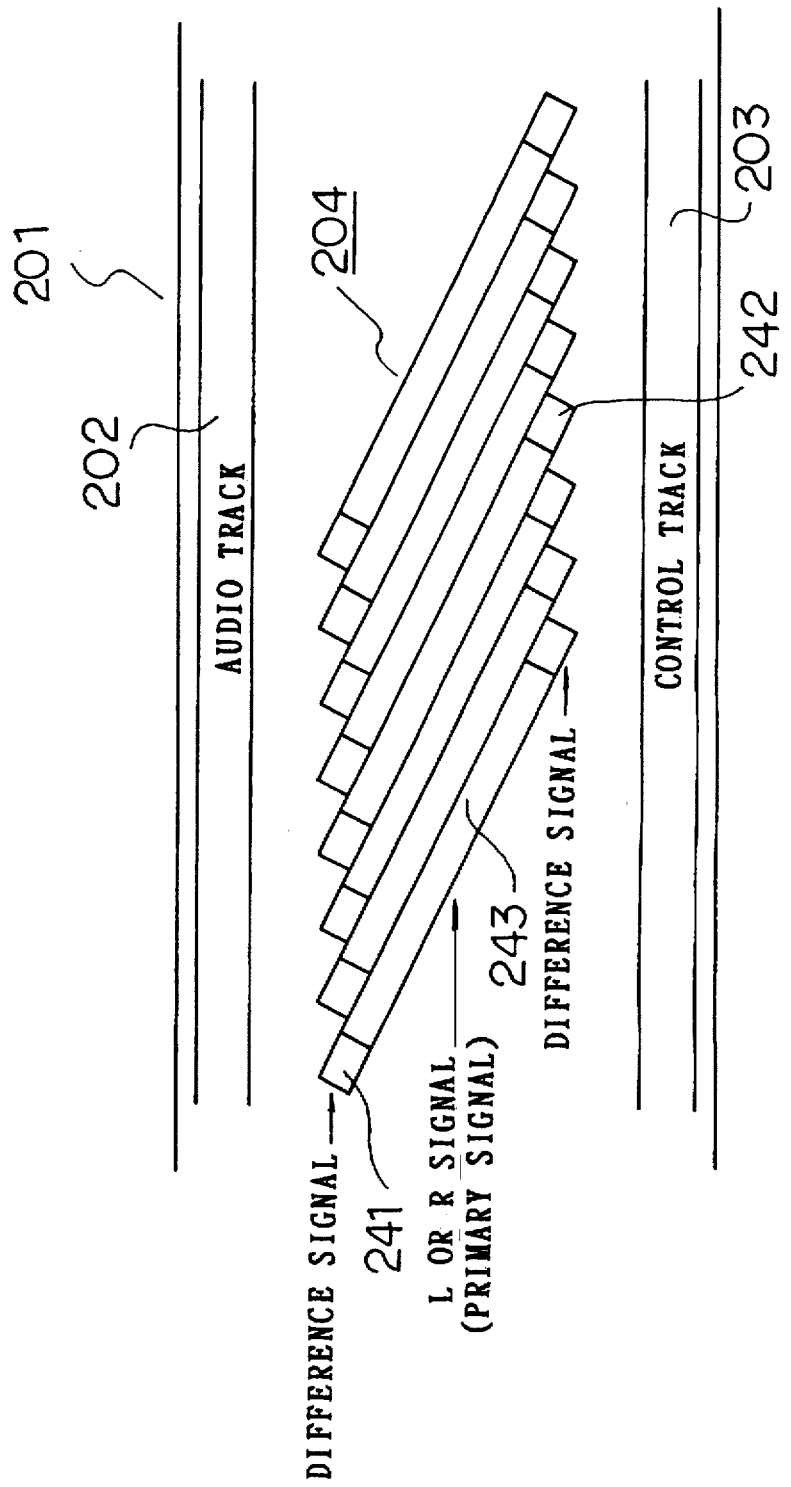
FIG. 13 is a model view showing a recording format on magnetic tape in a picture signal recording method of a third preferred embodiment of the present invention.

FIG. 13 is a diagram showing a recording format on magnetic tape as recording medium. Referring to FIG. 13, an audio track 202 for recording an audio signal is formed in upper portion of magnetic tape 201 while a control track 203 for recording a control signal is formed in lower portion of the magnetic tape 201. Skew tracks 204 for recording a picture signal are formed on the skew in order of alternate even and odd numbered fields. The skew tracks are all comprised of three parts, that is, difference signal regions 241 and 242 formed their respective upper and lower ends for recording a synchronization signal and a difference signal between a picture signal for left eye and that for right eye, and a primary signal region 243 interposed between those regions for recording the picture signal for either left eye or right eye working as the primary signal.

A TV screen for a single field either even numbered or odd numbered generally consists of 525 scanning lines, and approximately 480 lines of the 525 scanning lines are displayed on the screen. Thus, the remaining 45 lines are used for recording other signals; 6 lines of them are used for recording horizontal/vertical synchronization signals, and there still remains 39 lines. The 39 lines (referred to as "ineffective lines" hereinafter) are used for recording the difference signal between the picture signal for left eye and that for right eye. Since 39 lines of the difference signal are recorded to 480 lines of the primary signal, the required compression ratio on the time basis (mentioned later) becomes 39/480=about 1/12.

Figure 14:
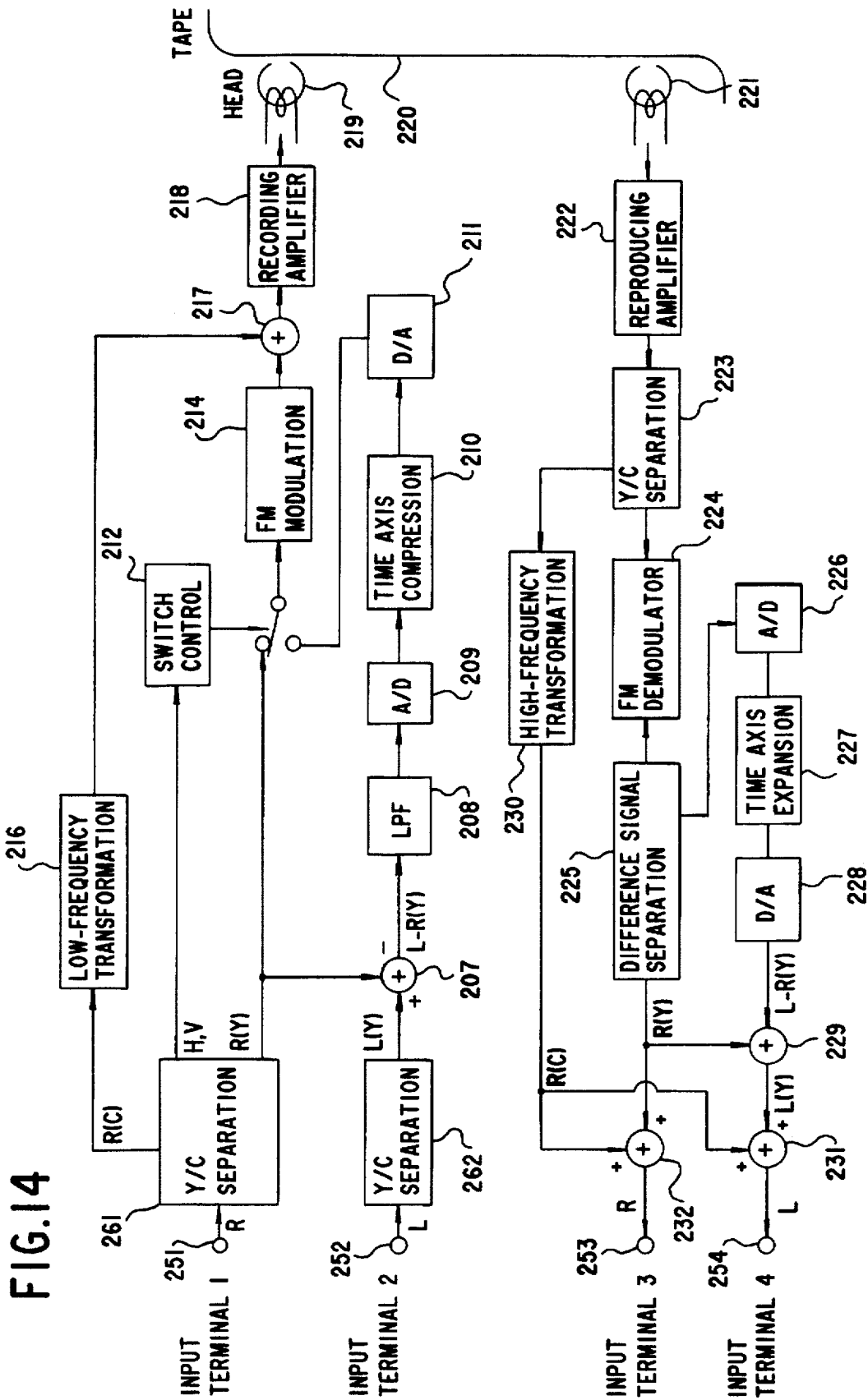
FIG. 14 is a block diagram illustrating a signal processing procedure in recording and reproducing systems for implementing the recording format of FIG. 13.

FIG. 14 is a block diagram showing a signal processing circuit which records and reproduces signals in accordance with the format illustrated in FIG. 13. In the following discussion, the picture signal for right eye represents the primary signal.

In a recording system in the upper half of FIG. 14, input terminals 251 and 252 work as input terminals for the picture signal R for right eye and the picture signal L for left eye, respectively. Y/C separating circuits 261 and 262 separate picture input signals received from the input terminals 251 and 252 into luminance signals Y and color signals C. An adder 207 adds the luminance signals R(Y) and L(Y) separated by and received from the Y/C separating circuits 261 and 262 to produce a difference signal "L−R(Y)". A low pass filter (LPF) 208 limits band of a signal output from the adder 207. An A/D converter 209 converts a signal output from the LPF 208 into a digital signal. A time axis compression circuit 210 compresses an output signal received from the A/D converter 209 on the time basis. A D/A converter 211 converts an output signal received from the time axis compression circuit 210 into an analog signal. A switch control circuit 212 receives a horizontal synchronization signal H and a vertical synchronization signal V received from the Y/C separation circuit 261 to control in accordance with those signals a switch 213 which switches signals between the luminance signal R(Y) produced by the Y/C separation circuit 261 and a signal output by the D/A converter 211. The switch 213 allows an FM modulator 214 to receive either of the luminance signal R(Y) or the output of the D/A converter 211. A low frequency transformation circuit 216 low frequency transforms the color signal R(C) received from the Y/C separation circuit 261. An adder 217 adds a signal received from the low-pass transformation circuit 216 and a signal from the FM modulator 214. A recording amplifier 218 amplifies the resultant added signal to apply it to a recording head 219. The recording head 219 records the signal on magnetic tape 220.

A reproducing system in the lower half of FIG. 14 will now be described. Basically, A procedure reverse to that stated above on the recording system is performed. A signal reproduced by a reproduction magnetic head 221 is applied to a reproducing amplifier 222. An FM demodulator 224 FM demodulates a signal output by a Y/C separation circuit 222. A difference signal separation circuit 225 separates the signal from the FM demodulator 224 into a reproduced luminance signal R(Y), a low-pass transformed color signal, and a time-axis compressed difference signal. An A/D converter 226 converts the compressed difference signal from the difference signal separation circuit 225 into a digital signal. A time axis expansion circuit 227 expands on the time basis a signal output by the A/D converter 226. A D/A converter 228 converts a signal output from the time axis expansion circuit 227 into an analog signal to produce the time-axis expanded difference signal "L−R(Y)". An adder 229 adds the luminance signal R(Y) and the difference signal L−R(Y) to produce the luminance signal L(Y). Reverse transformation circuit 230 reversely transforms the low-pass transformed color signal from the Y/C separation circuit 223 into the original color signal. An adder 231 adds the signal R(C) from the reverse transformation circuit 230 and the signal L(Y) output by the adder 229 to reproduce the picture signal L for left eye. An adder 232 similarly adds the signal R(C) from the reverse transformation circuit 230 and the signal R(Y) output by the difference signal separation circuit 225 to reproduce the picture signal R for right eye. Output terminals 253 and 254 of the picture signal for right eye and that for left eye produce the signals R and L, respectively.

In the previously described stereoscopic picture recording method, the signal R for right eye is received on the terminal 251 while the signal L for left eye is received on the terminal 252. After the Y/C separation circuits 261 and 262 respectively separate these signals, the adder 207 produces the difference signal L−R(Y) of the luminance signal. The LPF limits the band of the difference signal, and the time axis compression circuit 210 compresses the time axis of the resultant signal into about 1/12.

Then, the switch control circuit 212 and the switch 213 replace ineffective lines before and after the vertical synchronization signal for the primary signal with the time-axis compressed difference signal and further transform the resultant signal into the recording format for VTRs (i.e., VHS system or 8 mm video system) to record it on the magnetic tape 220. In reproduction, the Y/C separation circuit 223 performs Y/C separation on the time-axis compressed difference signal, and thereafter, the difference signal separation circuit 225 separates the difference signal L–R(Y) alone. The difference signal, after undergoing time-axis expansion, is added to the primary signal R(Y) and the color difference signal R(C) to obtain the signal L for left eye. The signal L is applied to the output terminal 254 while the signal R for right eye is applied to the output terminal 253.

In this embodiment, the difference signal is not necessarily treated through FM modulation recording but may be processed in direct recording like A.C. bias.

Recording as illustrated in FIG. 13 is performed on the magnetic tape 220, and the difference signal L–R(Y) must be used to reproduce the picture signal for left eye in reproducing stereoscopic pictures. In reproducing in two-dimension the picture signals recorded as stated above, the primary signal alone may be reproduced to reproduce the pictures utterly similar in ordinary VTRs, and thus, two-dimensional reproduction of stereoscopic picture signals recorded on the magnetic tape can be easily carried out without using a special reproducing player.

Also, the above embodiment discloses a system where the difference signal of the luminance signal alone is recorded, and reproduced color signals L and R have the same contents. The difference signal of the color signal can be recorded in the same manner with the above embodiment. This may be performed in the following two ways:

(1) A recording method where after the color signals L and R are low-pass transformed, a difference signal L–R(C) is found, and further after the difference signal is limited in band similar to the difference signal of the luminance signal, the resultant signal is compressed on the time basis and recorded.

(2) A recording method where after the color signals L and R are respectively transformed into component signals, difference signals L–R(B–Y) and L–R(R–Y) are found, and further after those difference signals are transformed into line sequence signals and limited in band, the resultant signals are compressed on the time basis and recorded. The "line sequence signal" herein is a single string of signal made by connecting scanning lines from two (sometimes three or more) kinds of original signals (in this case, L–R(B–Y) and L–R(R–Y)) in alternate order. In other words, after scanning lines of both the original signals are respectively thinned out to ½, each of the remaining scanning lines of one of the original signals is inserted into space between every adjacent two of the remaining scanning lines of the other original signal, and in this way the line sequence signal is formed.

As mentioned above, the scanning lines of the original signals are thinned out to ½ to make the line sequence signal. This is why the scanning lines thinned out must be restored in restoring the two original signals from the line sequence signal. In general, restoration of the scanning lines once thinned out is performed by finding arithmetical means of upper and lower scanning lines (interpolating between the upper and lower scanning lines). This restoration is named "line sequence interpolation".

Figure 15:
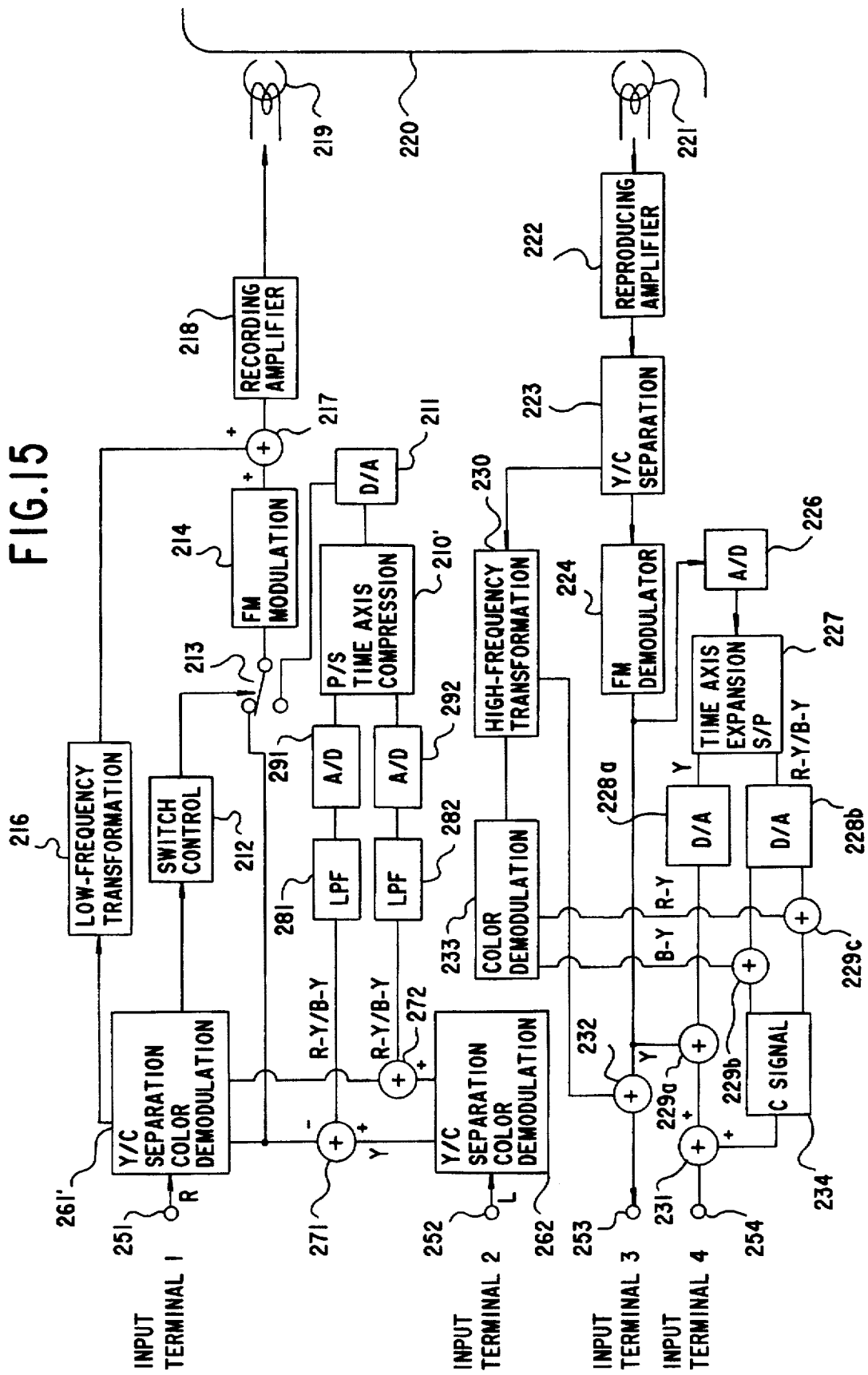
FIG. 15 is a block diagram showing a signal processing procedure in using a difference signal of a color signal to perform the recording.

FIG. 15 is a block diagram showing an exemplary signal processing procedure in the latter case, where like reference numerals denote corresponding components to those in FIG. 14, and detailed explanation about the components is omitted. In a circuit of FIG. 15 includes Y/C separation circuits 261' and 262' each having a color demodulation circuit, a P/S time axis transformation circuit 210', A/D converters 291 and 292, LPFs 281 and 282, adders 271 and 272, a time axis expansion S/P circuit 227', D/A converters 288a and 288b each having a line sequence interpolation circuit, adders 229a to 229c, a color demodulation circuit 233, and a C signal processing circuit 234.

As has been described, since the primary signal is recorded in a prior art VTR tape format, signals of effective lines recorded on the magnetic tape in the third preferred embodiment can lead to effectively recording stereoscopic pictures, retaining compatibility with the prior art VTRs.

A fourth preferred embodiment will now be described with reference to FIGS. 16 to 19.

Figure 16:
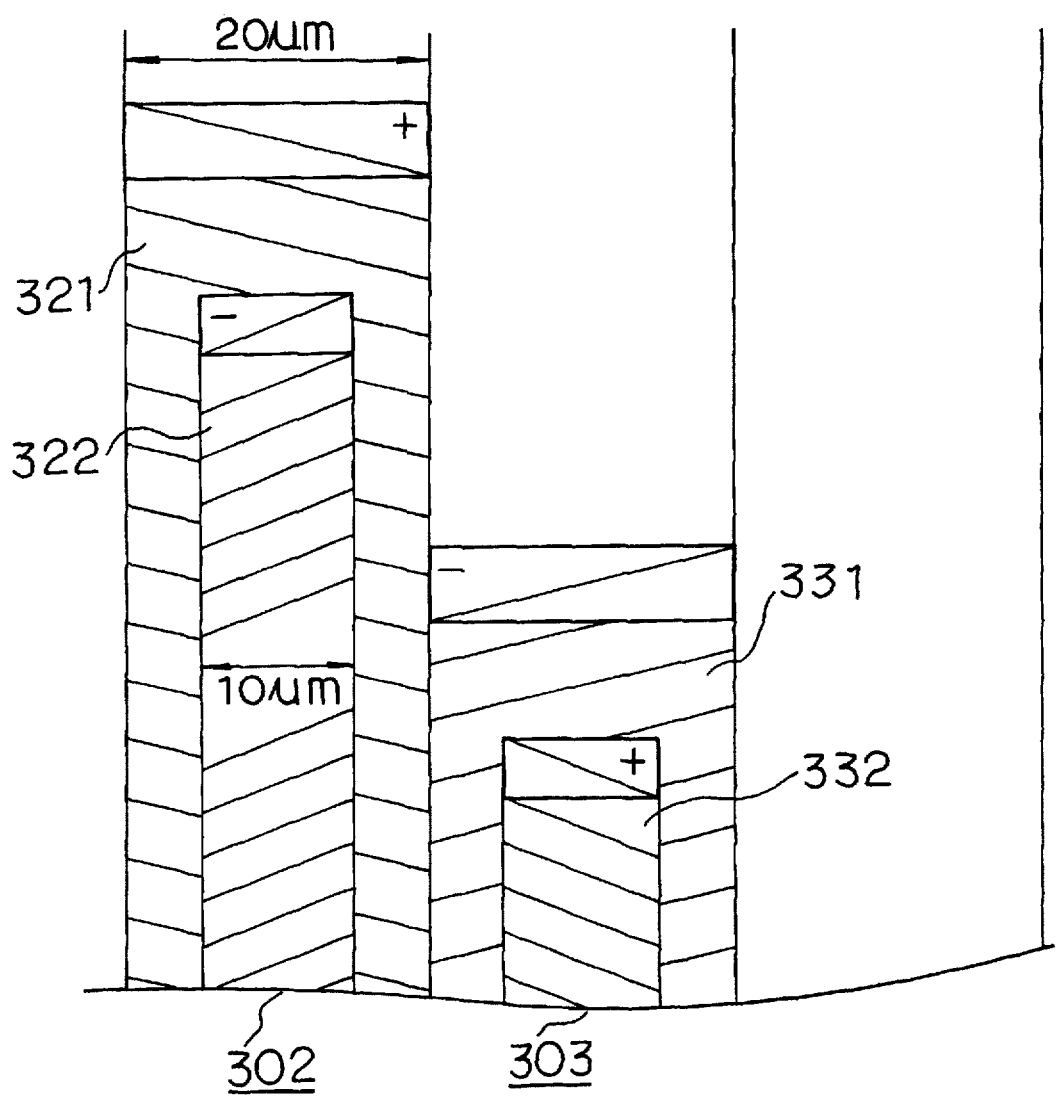
FIG. 16 is a model view showing a recording format on magnetic tape in a picture signal recording method of a fourth preferred embodiment of the present invention.

FIG. 16 is a diagram showing an exemplary recording format on magnetic tape as recording medium. Skew tracks (302, 303, and so forth) where picture signals are to be recorded are formed on magnetic tape 301. Each of the tracks has width of 8 mm system track pitch of 20 μm.

The tracks 302 and 303 respectively have main tracks 321 and 331 of 20 μm width equivalent to the entire width of the tracks, and subtracks 322 and 332 of 10 μm width in their respective center portions. The main tracks and subtracks 321, 331, 322 and 332 are different in azimuth angle from one another (i.e., different in plus/minus and also different in absolute value; however, allowing for manufacturing cost, it is disadvantageous to set azimuth to angles other than ±10 deg. in the 8 mm format, and therefore, all azimuth angles may be set to 10 deg. while a head may pass through the center in widthwise direction). Moreover, the main tracks 321, 331, and the subtracks 322, 332 are different in azimuth angle from each other between the adjacent tracks 302 and 303 (i.e., different in plus/minus but equivalent in absolute value).

In a first method of recording stereoscopic picture signals on the magnetic tape 301 of the above-mentioned track format, a picture signal for left eye constituting the stereoscopic picture signal is recorded in the main tracks 321, 331 while a picture signal for right eye is recorded on the subtracks 322, 332. This is effective when a ratio of recording areas of the main tracks 321, 331 to those of the subtracks 331, 332 are almost equivalent.

In a second recording method, either the picture signal for left eye or the picture signal for right eye is recorded on the main tracks 321, 331 while a difference signal of the picture signal for left eye and the picture signal for right eye is recorded on the subtracks 322, 332. The quantity of information of the difference signal can be reduced by an appropriate compression means, and it might be negligible, in this system, that the recording areas of the subtracks 322, 332 are relatively small as with 2:1 ratio of the recording areas of the main tracks 321, 331 to those of the subtracks 322, 332.

In a third recording method, a means of deep layer recording is employed. The magnetic tape 301 is formed of a surface recording layer, an intermediate recording layer, and a base layer; the main tracks 321, 331 are formed in the surface recording layer where picture signals are recorded in 5.4 to 7 MHz record frequency, and the subtracks 322, 332 are formed in the intermediate recording layer where the picture signals are recorded in 1.3 to 1.7 MHz record frequency.

In such a case, it is necessary to vary the record frequency from the main tracks 321, 331 to the subtracks 322, 332; thus, this system is not suitable to a case where the picture signal for left eye and that the picture signal for right eye are to be separately recorded in separate tracks. However, this system is advantageous in recording the difference signal on the subtracks 322, 332 since a recording area for the primary signal or recording capacity can be kept large.

In any of the first to third recording methods, crosstalk between adjacent ones of the main tracks and between the main track and the subtrack can be avoided by varying the azimuth angles from each other.

Figure 17:
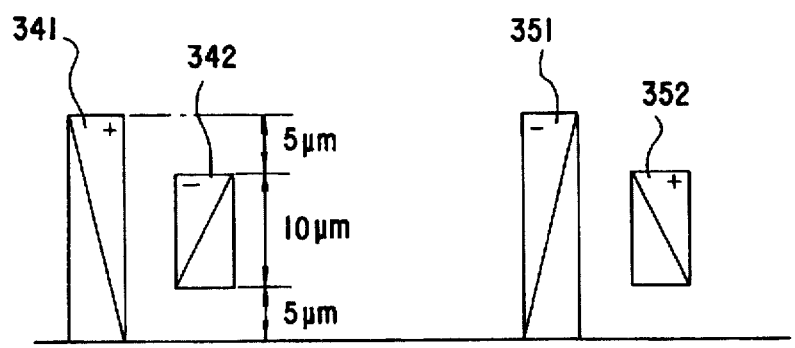
FIG. 17 is a diagram showing an arrangement of a head in implementing the recording formation of FIG. 16.

Further, in recording with the format of FIG. 16, if the head is arranged as illustrated in FIG. 17 where main heads 341, 351 and subheads 342, 352 are put in parallel with each other, having their respective widths set to ±2 to 3 μm relative to the widths of the recording tracks (e.g., in FIG. 17, the widths of the heads are equal to those of the tracks in ideal conditions), the crosstalk as well as undesirably reading information from an adjacent track can be prevented, and noise is reduced, and eventually the S/N ratio can be enhanced.

Either the main tracks 321, 331 or the subtracks 322, 332 may be reproduced in reproducing signals in a two-dimensional VTR system, and this surely keeps compatibility between two-dimensional pictures and stereoscopic pictures.

Figure 18:
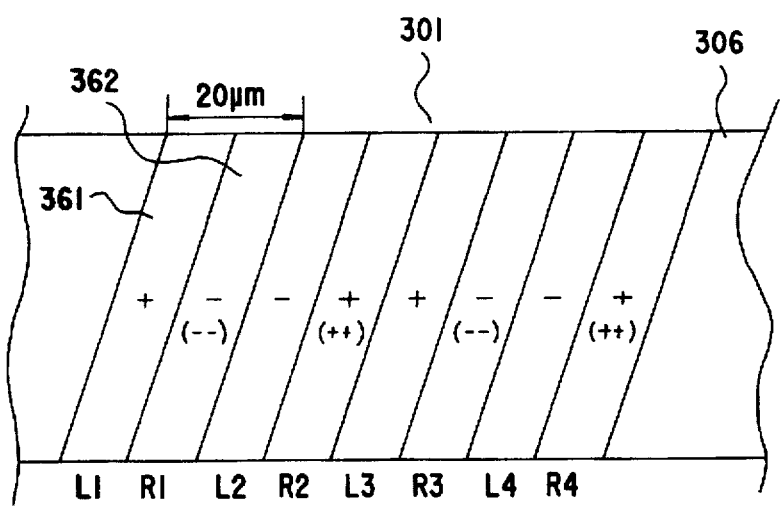
FIG. 18 is a model view showing a recording format on magnetic tape in a picture signal recording method of a variation of the fourth preferred embodiment of the present invention.

FIG. 18 depicts a variation of the recording format on the magnetic tape as recording medium. In FIG. 18, audio tracks for recording audio signals in upper portion of magnetic tape 301 and control tracks for recording control signals in lower portion are omitted.

In a record track 306 for recording picture signals, there lie tracks 361, 362 and so forth having pitch of a half of 20 μm track pitch in VHS type VTRs, where stereoscopic picture signals L1, L2 and so forth for left eye and stereoscopic picture signals R1, R2 and so forth for right eye are recorded in such an order as R1, L2, R2, L3, R3 and so forth.

A synchronization signal is recorded in the above mentioned tracks. Symbols, "+" and "−", applied to the tracks are signs for an azimuth angle. Symbols, "++" and "−−", denote an azimuth angle of doubled value to the azimuth marked with "+" or "−".

Figure 19:
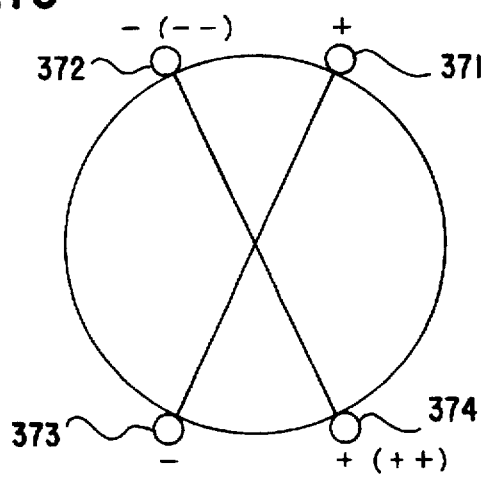
FIG. 19 is a diagram showing an arrangement of a head in implementing the recording format of FIG. 18.

In implementing this in double azimuth, the head should be arranged as shown in FIG. 19. In FIG. 19, symbols "+" and "−" are signs applied to azimuth angles of heads 371 to 374 similar to the above case. For example, assuming that a single "+" or "−" corresponds to 10 deg., the azimuth angles of the tracks 361, 362 adjacent to each other in FIG. 18 are +10 deg., −20 deg., −10 deg., +20 deg., and so forth.

Azimuth loss of about ±20 deg. may be insufficient to attain the intended effect, and ±30 deg. brings about the same effect as in the specification of the 8 mm type VTRs. However, as the azimuth angle becomes larger, an effective gap length of the head becomes greater; and a demerit that ability to record and/or reproduce broad band is degraded must be taken into consideration.

In the above variation, it is possible to sufficiently reduce crosstalk between the tracks 361 and 362 by virtue of variations in the azimuth angle, and the S/N ratio can also be enhanced.

In reproduction in the two-dimensional VTR system, signals recorded on either the track L or the track R may be reproduced, and this can keep compatibility between two-dimensional pictures and stereoscopic pictures.

As has been described, in the fourth preferred embodiment according to the present invention, the recording and reproducing systems are made compatible between two-dimensional pictures and stereoscopic pictures, and deterioration of reproduced signals caused by crosstalk between adjacent tracks can be prevented in reproducing the stereoscopic pictures.

A fifth preferred embodiment of the present invention will be described in detain with reference to FIGS. 20 to 24.

Figure 20:
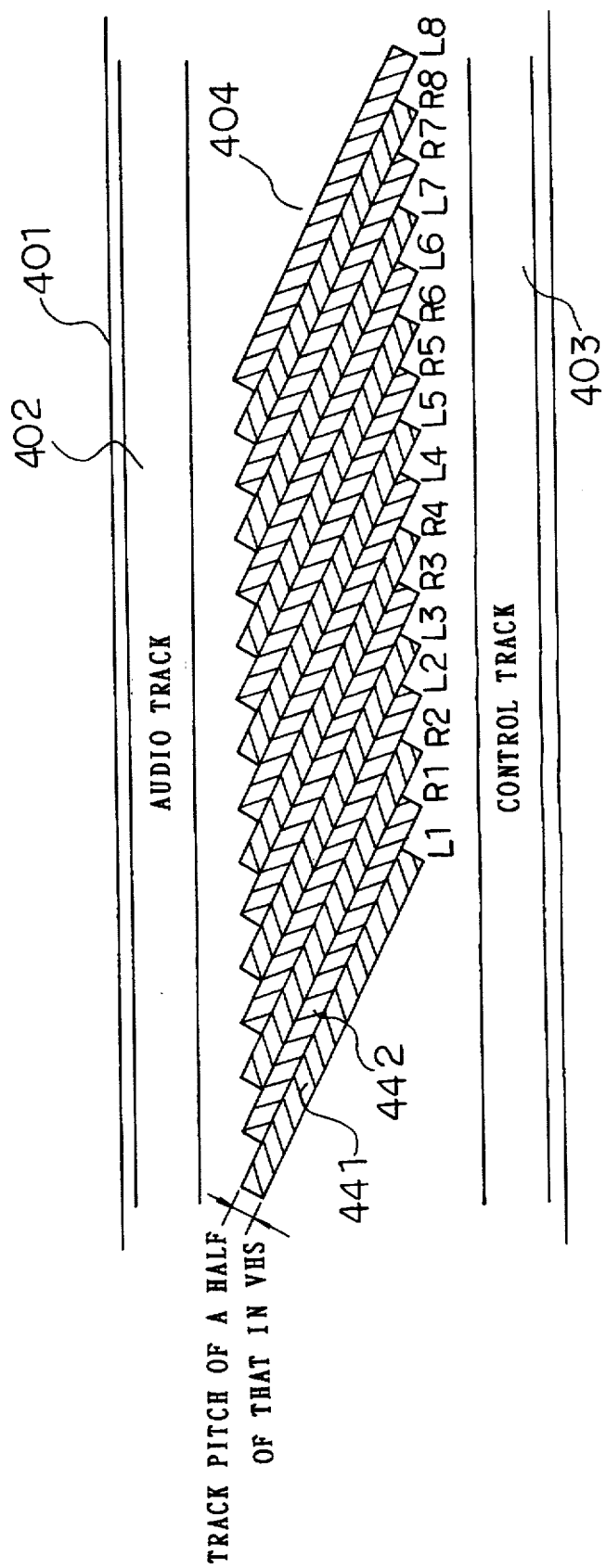
FIG. 20 is a model view showing a recording format on magnetic tape in a picture signal recording method of a fifth preferred embodiment of the present invention.

FIG. 20 is a diagram showing an exemplary recording format on magnetic tape as recording medium. An audio signal recording audio track 402 is formed in upper portion of magnetic tape 401. A control signal recording control track 403 is formed in lower portion of the magnetic tape 401.

In a skew record track 404 for recording picture signals, there lie tracks 441, 442 and so forth having pitch of a half of the track pitch in the VHS, where stereoscopic picture signals L1, L2 and so forth for left eye and stereoscopic picture signals R1, R2 and so forth for right eye are recorded with azimuths varied between adjacent tracks in such an order as L1, R1, R2, L2, L3, R3 and so forth, as shown in FIG. 20.

A synchronization signal is recorded in the above mentioned tracks 441, 442 and so forth. Directions of hatching drawn in the tracks represent that azimuths vary between adjacent tracks.

Figure 21:
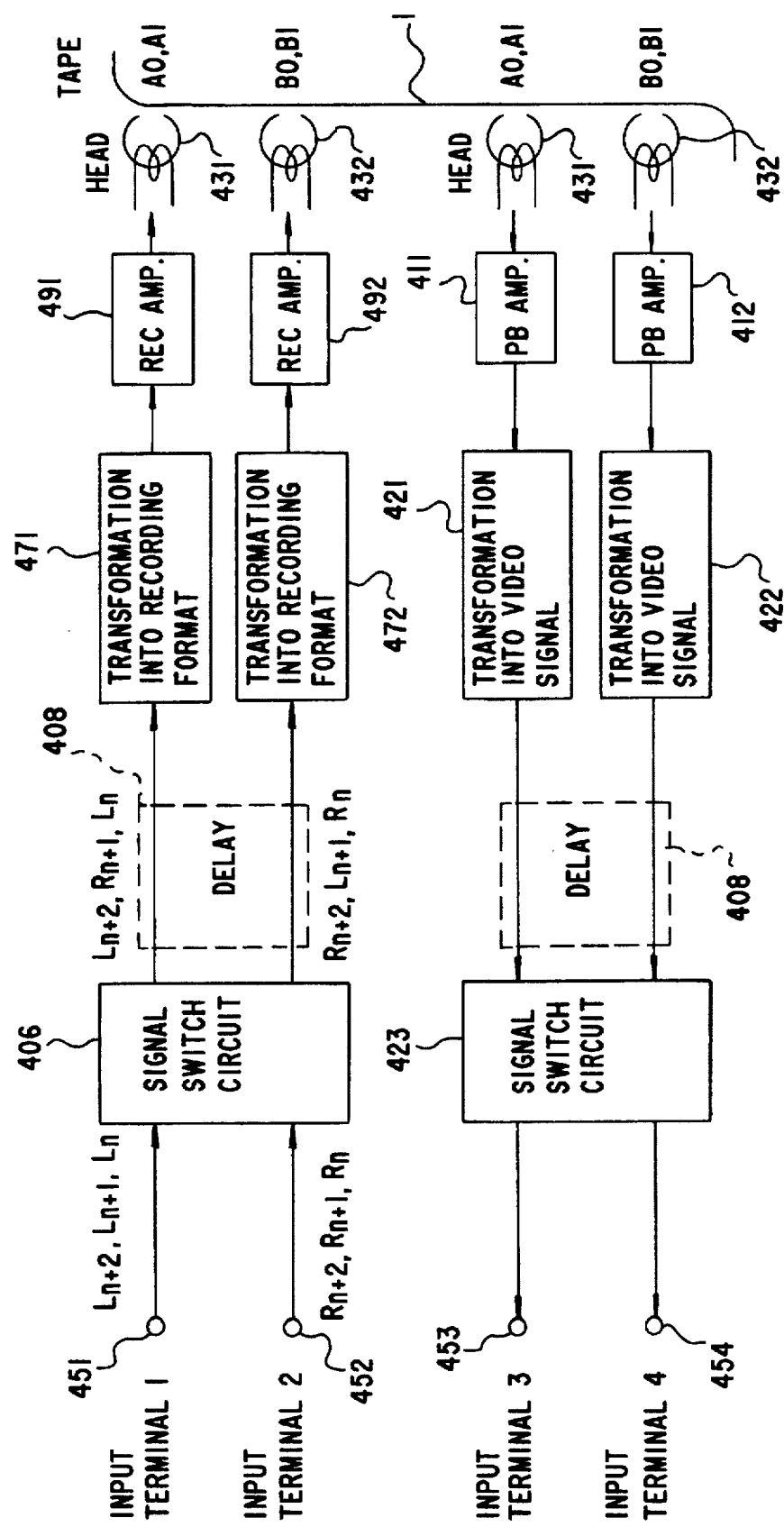
FIG. 21 is a block diagram illustrating a signal processing procedure in recording and reproducing systems in implementing the recording format of FIG. 20.

FIG. 21 is a block diagram showing a signal processing circuit for recording and reproducing signals in accordance with the format of FIG. 20. The following description will treat a picture signal for right eye as a primary signal.

In a recording system in an upper half of FIG. 21, picture signals, Ln+2, Ln+1, and Ln (n is a natural number; the signals are input reversely in order), for left eye are received on an input terminal 451 while picture signals, Rn+2, Rn+1, and Rn (the signals are input reversely in order), for right eye are received on an input terminal 452. A signal switch circuit 406 outputs the picture signals received from the input terminals 451, 452 in arranged order of Ln+2, Rn+1, Ln and Rn+2, Ln+1, Rn, respectively.

Figure 22:
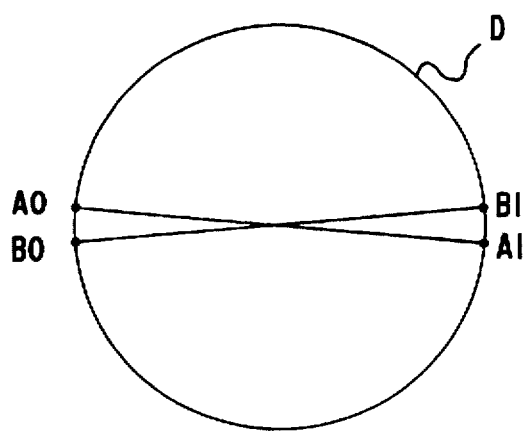
FIG. 22 is a schematic top plan view showing a head of FIG. 21.
Figure 23A:
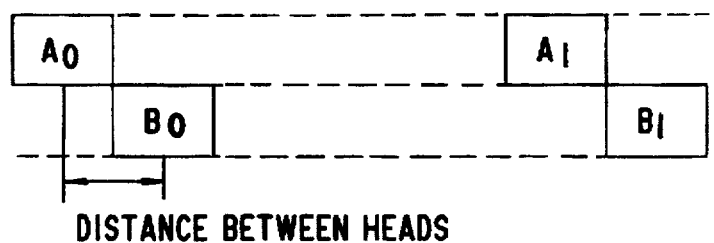
FIG. 23A and FIG. 23B are schematic side views showing first and second examples of a magnetic head.
Figure 23B:
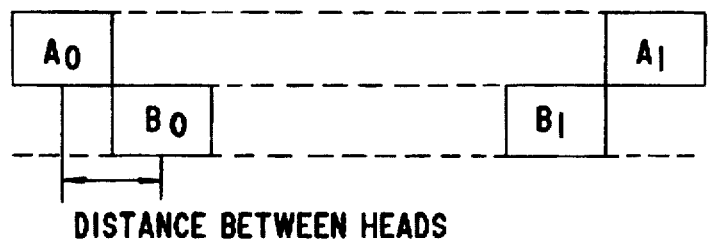

Referring to FIG. 22, a recording/reproducing head has two pairs of heads A0, A1 and B0, B1 provided in a rotational drum D with the same azimuth at opposite terminals of a diameter of the drum. Generally, as shown in FIG. 23A, double azimuth or a delay circuit 408 (shown by broken line in FIG. 2) for compensating a distance between two heads in the same position is needed, following the signal switch circuit 406, if a common two-head element is used. However, if symmetrical head elements are used, as shown in FIG. 23B, the delay circuit is no longer needed.

Format transformers 471, 472 transform signals output by the signal switch circuit 406 or the delay circuit 408 into a predetermined magnetic tape recording format for stereoscopic pictures. REC amplifiers 491, 492 amplify format transformed signals. Recording magnetic heads 101, 102 correspond to the pairs of heads, A0, A1 and B0, B1.

In a reproducing system in a lower half of FIG. 21, basically, a procedure reverse to the signal processing procedure in the recording system is performed, and reproducing magnetic heads 431, 432 (the equivalents to the recording magnetic heads) reproduce signals from the tape. PB amplifiers 411, 412 amplify reproduced signals. Signal transformation circuits 421, 422 transform signals from the amplifiers 411, 412 into video signals. A signal switch circuit 423 separates the video signals from the transformation circuits 421, 422 into a picture signal for right eye and a picture signal for left eye. An output terminal 453 of the picture signal for right eye and an output terminal 454 of the picture signal for left eye respectively output a reproduced signal for left eye and a reproduced signal for right eye.

In the stereoscopic picture recording method as mentioned above, the signals, Ln+2, Ln+1, and Ln, for left eye are received on the terminal 451 while the signals, Rn+2, Rn+1, and Rn, for right eye are received on the terminal 452.

The signal switch circuit 406 switches the signals for left eye, Ln, Ln+1, Ln+2 and so forth received on the terminal 451 and the signals for right eye, R, Rn+1, Rn+2 and so forth received on the terminal 452 so that the signals Ln, Rn+1, Ln+2 and so forth are applied to the heads A0 and A1 while the signals Rn, Ln+1, Rn+2, Ln+3 and so forth are applied to the heads B0 and B1. In this way, eventually, even numbered fields of the signal L for left eye are applied to the head A0, odd numbered fields of the signal R for right eye are applied to the head A1, even numbered fields of the signal R are applied to the head B0, and odd numbered fields of the signal L are applied to the head B1.

The signals processed by the signal switch circuit 406 pass through the delay circuit 408 if the delay circuit is provided, or otherwise without the delay circuit, they are directly transmitted to the format transformers 471, 472 and transformed into signals of the recording format. After that, the resultant signals are sequentially recorded every field at the tape feeding speed and drum rotation rate as in the prior art VHS system by the heads A0, A1, B0 and B1.

In signal reproduction, a procedure reverse to that of signal recording is performed, and the picture signal for left eye is reproduced at the terminal 453 while the picture signal for right eye is reproduced at the terminal 454. Through such a procedure, signals are recorded on the tape 401 as shown in FIG. 20.

Although, in the above arrangement, the two pairs of the opposing heads are operated at the same tape feeding speed and the same drum rotation rate with the prior art VTR, after signals recorded by a pair of opposing heads are compressed on the time basis to ½, they may be recorded or reproduced in the format of FIG. 20 at the doubled drum rotation rate so as to attain the same effects.

In such a case, however, in the signal processing circuit of FIG. 21, a time axis compression circuit has to be positioned before the signal switch circuit (for recording) 406 while a time axis expansion circuit has to be positioned after the signal switch circuit (for reproducing) 423.

FIG. 24 is a diagram showing a recording format for assuring compatibility between two-eyed type stereoscopic picture information and four-eyed type stereoscopic picture information; a record region for a primary signal in a 180 deg. section of each of the recording tracks in FIG. 24 is similar to the above embodiment, and therefore, detailed description about it is omitted.

In an embodiment employing a four-eyed type, a difference signal of first and second signals for right eye or first and second signals for left eye required as four-eyed stereoscopic picture information is recorded in an overlapping region 443 except for the primary signal region in the skew track, corresponding to the signal for right eye or the signal for left eye recorded in the primary signal region.

As to the skew track on the left end in FIG. 24, since a first signal L1 for left eye is recorded in the primary signal recording region, a difference signal L'1–L1 of the first signal L1 for left eye and a second signal L'1 for left eye is recorded in the corresponding overlapping region.

In the skew track next to the above, since a first signal R1 for right eye is recorded in the primary signal region, a difference signal R'1–R1 of the first signal R1 for right eye and a second signal R'1 for right eye is recorded in the corresponding overlapping region.

In this way, in the overlapping regions of the skew tracks 441, 442, difference signals L'1–L1, R'1–R1, R'2–R2, L'2–L2, L'3–L3, R'3–R3 and so forth are recorded.

Reproducing heads are used to scan the primary recording region and overlapping region and read information thereon in the reproducing procedure, the first and second signals for right eye or those for left eye are reproduced, and thus, four-eyed type stereoscopic pictures can be reproduced.

The primary recording region alone is scanned by the reproducing head to read information thereon in the reproducing procedure, the first signal for right eye or that for left eye is reproduced, and thus, two-eyed type stereoscopic picture can be reproduced.

Furthermore, a two-dimensional VTR reproducing head is used to scan merely the track of one of azimuths in the primary recording region in the reproducing procedure to read information thereon, and thus, two-dimensional pictures can be reproduced.

As has been described, when signals recorded on tape by means of recording/reproducing method of the fifth preferred embodiment according to the present invention are reproduced in the prior art VTR, only either the signals for left eye or those for right eye can be reproduced depending upon azimuth.

When signals recorded on tape by means of the prior art VTR are reproduced in the recording/reproducing method according to the present invention, the signals are reproduced by either the heads for left eye or those for right eye, and reproduced signals are output to either an output terminal for left eye or an output terminal for right eye.

In this way, compatibility in recording/reproducing picture signals can be retained from the upper level (stereoscopic pictures) to the lower level (two-dimensional pictures) or vise versa.

Recording difference signals of the first and second signals for right eye and those for left eye in the overlapping region, compatibility between two-eyed type stereoscopic pictures and four-eyed type stereoscopic pictures can be assured.

Figure 25:
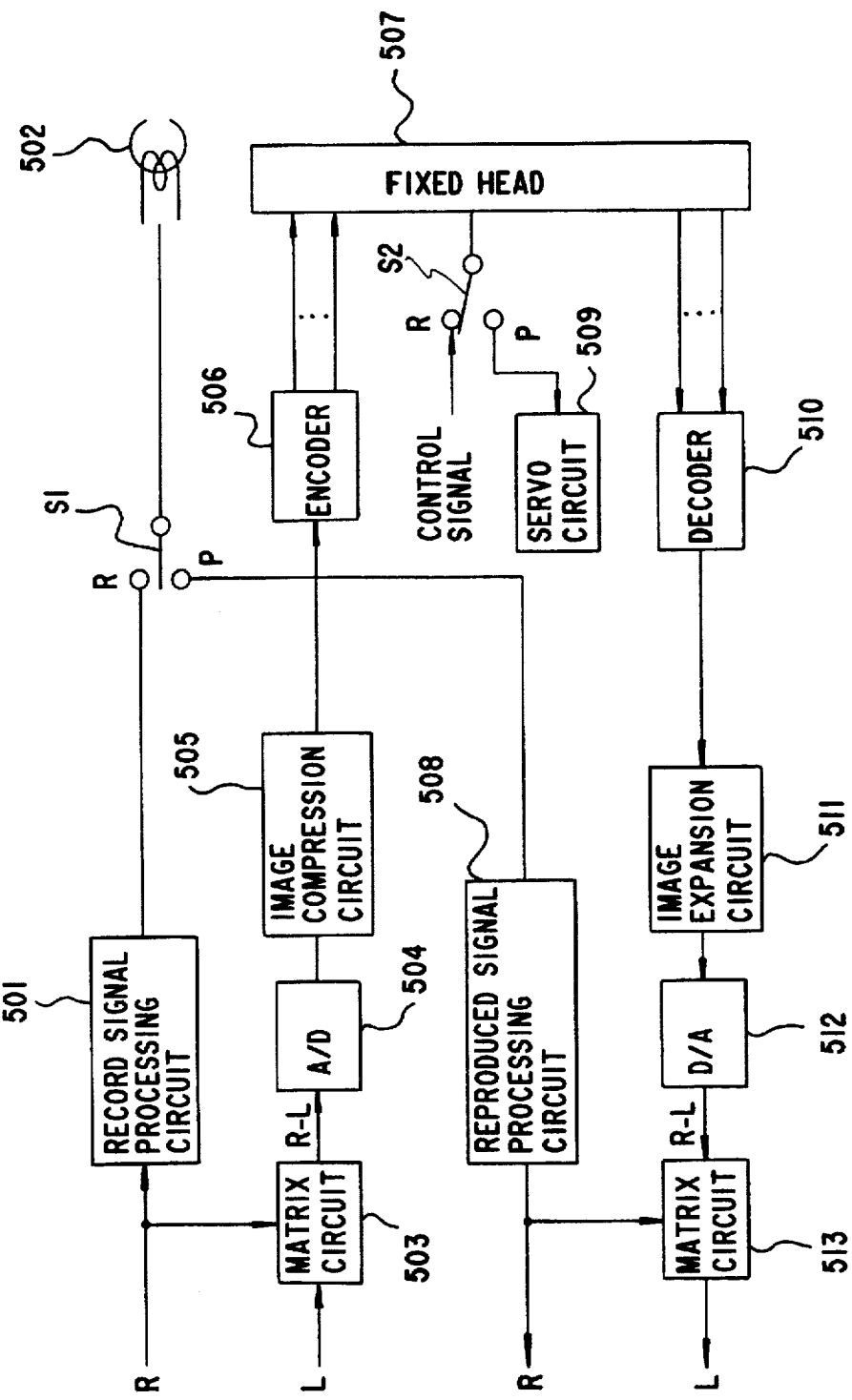
FIG. 25 is a block diagram showing a VTR in which a picture signal recording method of a sixth preferred embodiment of the present invention is implemented.
Figure 26:
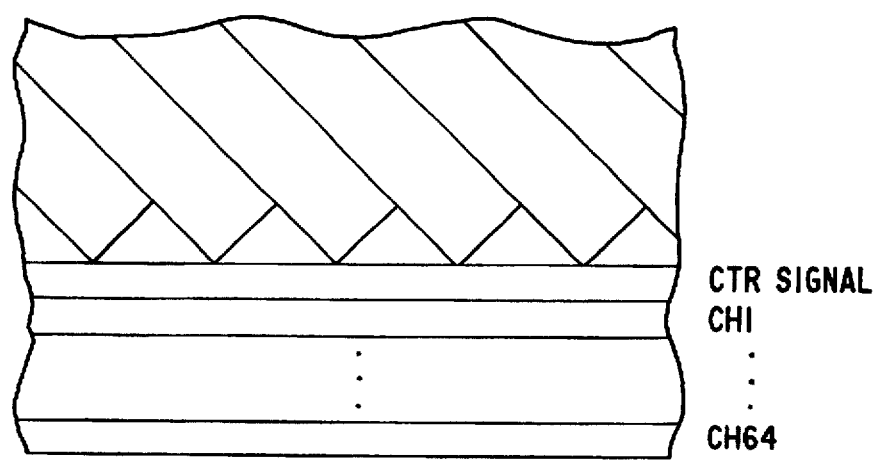
FIG. 26 is a model view showing a recording pattern on tape in the picture signal recording method of FIG. 25.

A sixth preferred embodiment of the present invention will be described with reference to FIGS. 25 and 26. FIG. 25 is a block diagram showing a VTR where a recording method of th present invention is implemented. In this embodiment, a picture signal R for right eye is treated as a primary channel while a difference signal R–L of the picture signal R for right eye and a picture signal L for left eye is treated as a subchannel. An additional signal may be used as the subchannel.

In recording, the primary channel, after undergoing analog signal processing as in the prior art technique in a record signal processing circuit 501, is transmitted to a switch S1 and then recorded on skew tracks of magnetic tape by a rotational head 502. On the other hand, a picture signal L for left eye is subtracted from the picture signal R for right eye by a matrix circuit 503 to find a difference (R–L), and there remains the subchannel. The subchannel is converted into a digital signal by an A/D converter 504 and then compressed to about one several tenth by an image compression circuit 505. Then, after the compressed signal is divided into 64 channels by an encoder 506, the resultant 64 channels are applied to a fixed head 507 together with a control signal. The fixed head 507 is a multi-channel head (65-channel head); 64 channels is allocated to output of the encoder while 1 channel is allocated to the control signal, and as shown in FIG. 26, they are recorded on elongated tracks of magnetic tape. Herein, the control signal is a signal based upon a vertical synchronization signal as in the prior art.

In the reproducing procedure, output of the rotational head 502, after passing through the switch S1, is processed by a reproduce signal processing circuit 508, and the primary channel is reproduced. The control signal of the output of the fixed head 507, after passing through a switch S2, is applied to a servo circuit 509. Output of the remaining 64 channels is decoded by a decoder 510 and restored to the original difference data by an image expansion circuit 511. The resultant signal is further converted into a digital signal by a D/A converter 512, and thus, the subchannel is obtained. The subchannel together with the picture signal R for right eye are processed by a matrix circuit 513 to produce the picture signal L for left eye.

Thus, the primary channel (picture signal R for right eye) recorded on tape in the VTR of this embodiment are reproduced with compatibility with the prior art VHS type VTR. Furthermore, signals recorded on tape in the VHS type VTR can be reproduced by the VTR of the present invention. Also, reproducing the control signal can be well done because the fixed head is of multi-channel type.

Although recording/reproducing the primary channel is performed on the analog basis in this embodiment, that certainly can be performed on the digital basis in a digital VTR.

The number of channels of the difference data can be reduced by employing an high efficiency image compression means.

As has been described, in the sixth preferred embodiment of the present invention, stereoscopic images can be recorded/reproduced with perfect compatibility with the prior art VTR.

A seventh preferred embodiment of the present invention will be described below with reference to FIGS. 27 and 28.

Figure 27:
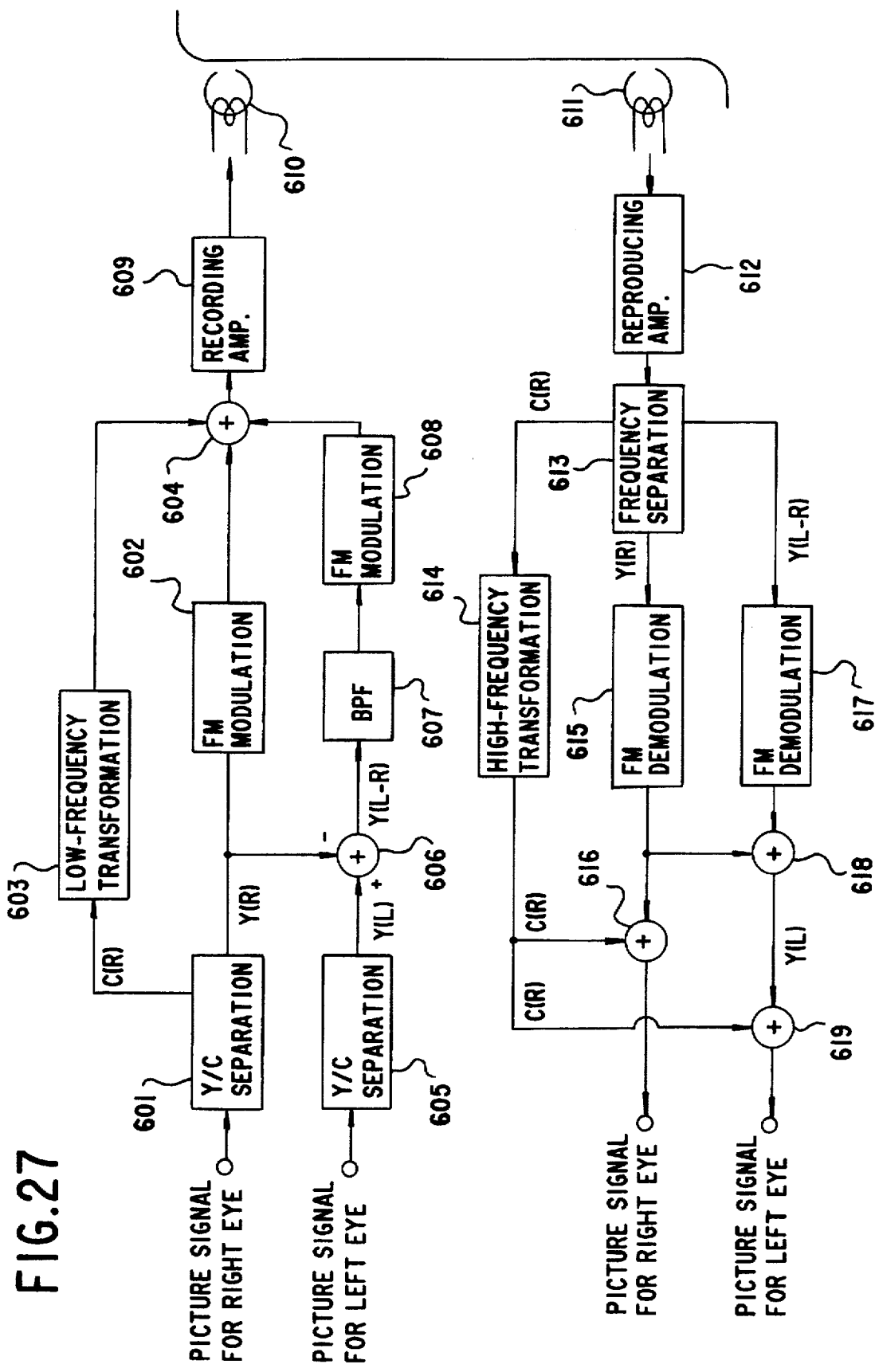
FIG. 27 is a block diagram showing a VTR in which a picture signal recording method of a seventh preferred embodiment of the present invention is implemented.

FIG. 27 is a block diagram showing a stereoscopic VTR where a recording method of the present invention is implemented. In this embodiment, a picture signal R for right eye is treated as a primary channel while a difference signal L–R of the picture signal R for right eye and a picture signal L for left eye is treated as a subchannel. Instead, an additional signal may be recognized as the subchannel.

In the recording procedure, the picture signal R for right eye is separated into a luminance signal Yr and a color signal Cr by a Y/C separation circuit 601. The luminance signal Yr is FM modulated with 3.9 MHz center frequency and 1 MHz frequency shift by a first FM modulation circuit 602. The color signal Cr is low frequency transformed from 3.58 MHz to 629 kHz by a low frequency transformation circuit 603 and undergoes adding operation in an adder 604. A circuit arrangement in this stage is completely the same as that of the prior art VHS system.

The picture signal l for left eye is YC separated into a luminance signal Yl by a separation circuit 605. The luminance signal Yr is subtracted from the luminance signal Yl by a subtracter 606 to find a difference (Yl–Yr). The (Yl–Yr), after passing through a band pass filter 607, is transmitted to a second FM modulation circuit 608 and is FM modulated with 8 MHz center frequency and 0.5 MHz frequency shift. The resultant FM modulated output is mixed with output signals from the circuits 602, 603, and the resultant signal, after passing through a recording amplifier 609, is recorded on tape by a recording head 610. The difference signal (Yl–Yr) is frequency-multiplexed with high pass band of the primary channel and recorded on the same skew track.

Figure 28:
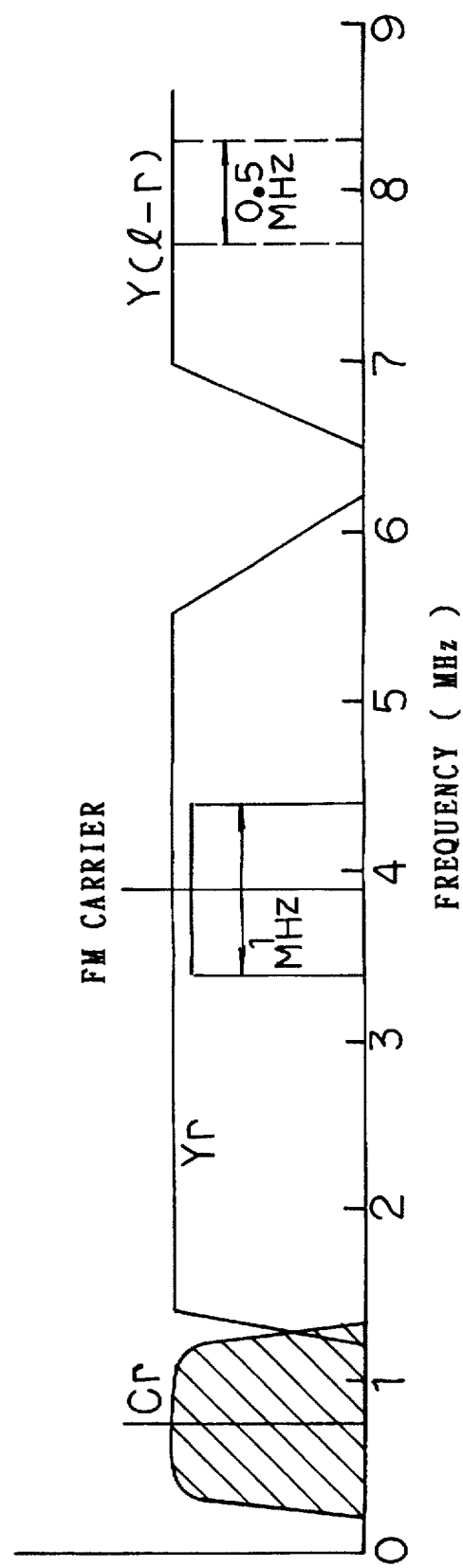
FIG. 28 is a diagram showing frequency spectrum of a record signal in the picture signal recording method of FIG. 27.

FIG. 28 depicts frequency spectrum of a record signal in this embodiment.

In the reproducing procedure, a signal reproduced by a reproducing head 611, after passing through a reproducing amplifier 612, is separated into the color signal Cr, the luminance signal Yr and the difference signal (Yl–Yr) by a frequency separation circuit 613. The color signal Cr is transformed and restored into the original 3.58 MHz carrier color signal by a high frequency transformation circuit 614. The luminance signal Yr is FM demodulated by a first FM demodulation circuit 615 and added to the color signal Cr by an adder 616, and in this way, the picture signal R for right eye is obtained.

The difference (Yl–Yr) is FM demodulated by a second FM demodulation circuit 617 and added to the luminance signal Yr into the luminance signal Yl by an adder 618. Furthermore, the luminance signal Yl is added to the color signal Cr by an adder 619, and in this way, the picture signal l for left eye is obtained.

Signals recorded on tape in the VTR of this embodiment can be reproduced by the prior art VHS type VTR with compatibility of the primary channel.

In this embodiment, a difference components to be recorded is limited to the luminance signal, and a color signal component of the picture signal for left eye is not recorded. However, since the visual sensitivity of a human being upon colors is low, adding the color signal Cr component for right eye to the luminance signal Yl for left eye to get the picture signal L for left eye does not degrade visual stereoscopic impression.

Figure 29:
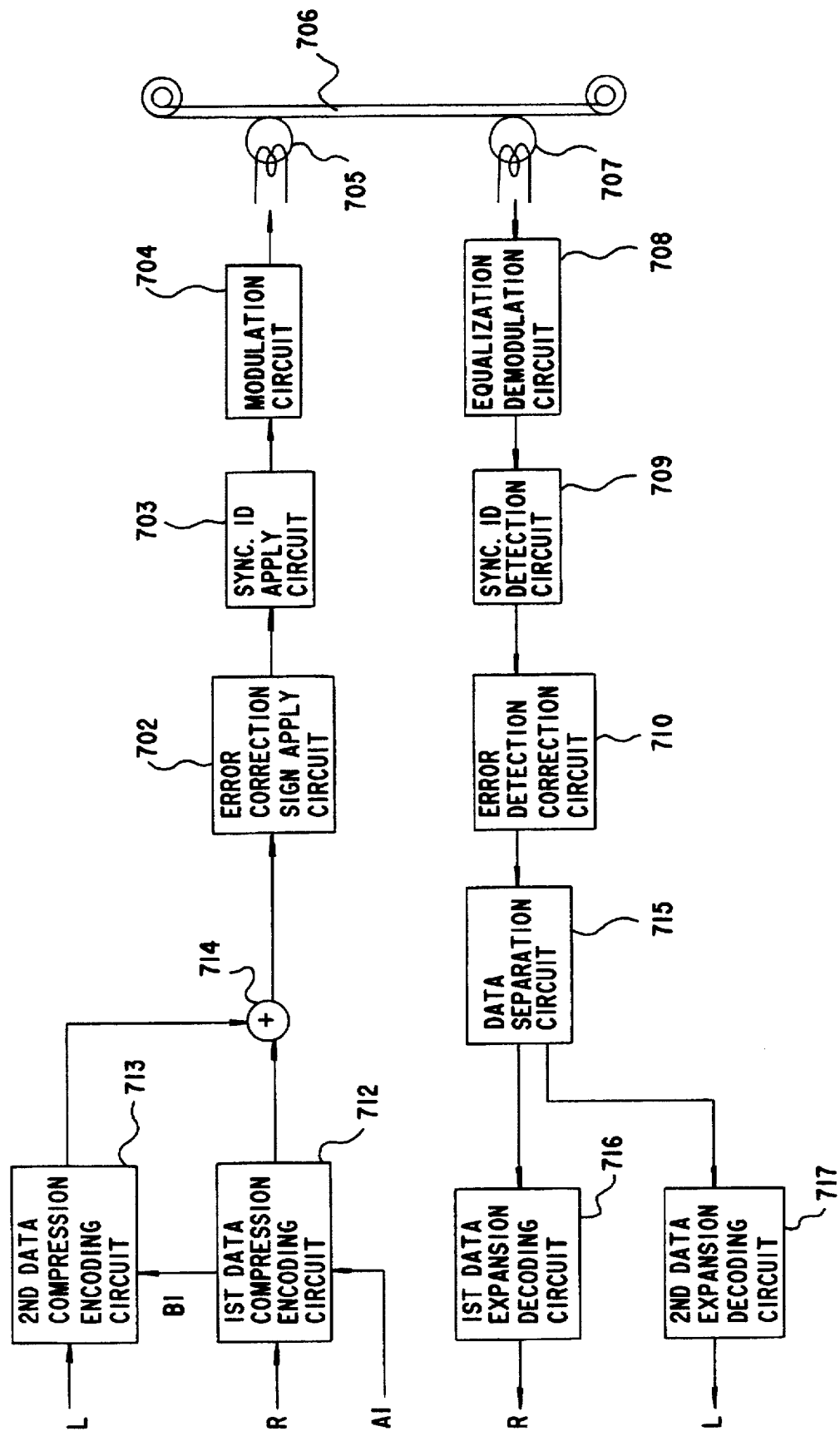
FIG. 29 is a block diagram showing a digital VTR in which a picture signal recording method of an eighth preferred embodiment of the present invention is implemented.

As has been described, in accordance with the present invention, recording/reproducing stereoscopic images can be performed with perfect compatibility with the prior art VTR. An eighth preferred embodiment of the present invention will be described with reference to FIGS. 29 to 33. In this embodiment, the present invention is applied to a digital VTR which records and reproduces stereoscopic picture data. FIG. 29 is a schematic block diagram showing a digital VTR suitable to this embodiment.

In the recording procedure, right channel data R in stereoscopic picture data sampled by a specific frequency is compressed and encoded by a first data compression encoding circuit 712 while left channel data l is compressed and encoded by a second data compression encoding circuit 713, and then they are added by an adding circuit 714. The added data is, similar to the prior art, processed so as to be marked with an error correction sign P and a synchronization and ID sign S and then NRZI modulated and recorded.

Figure 30:
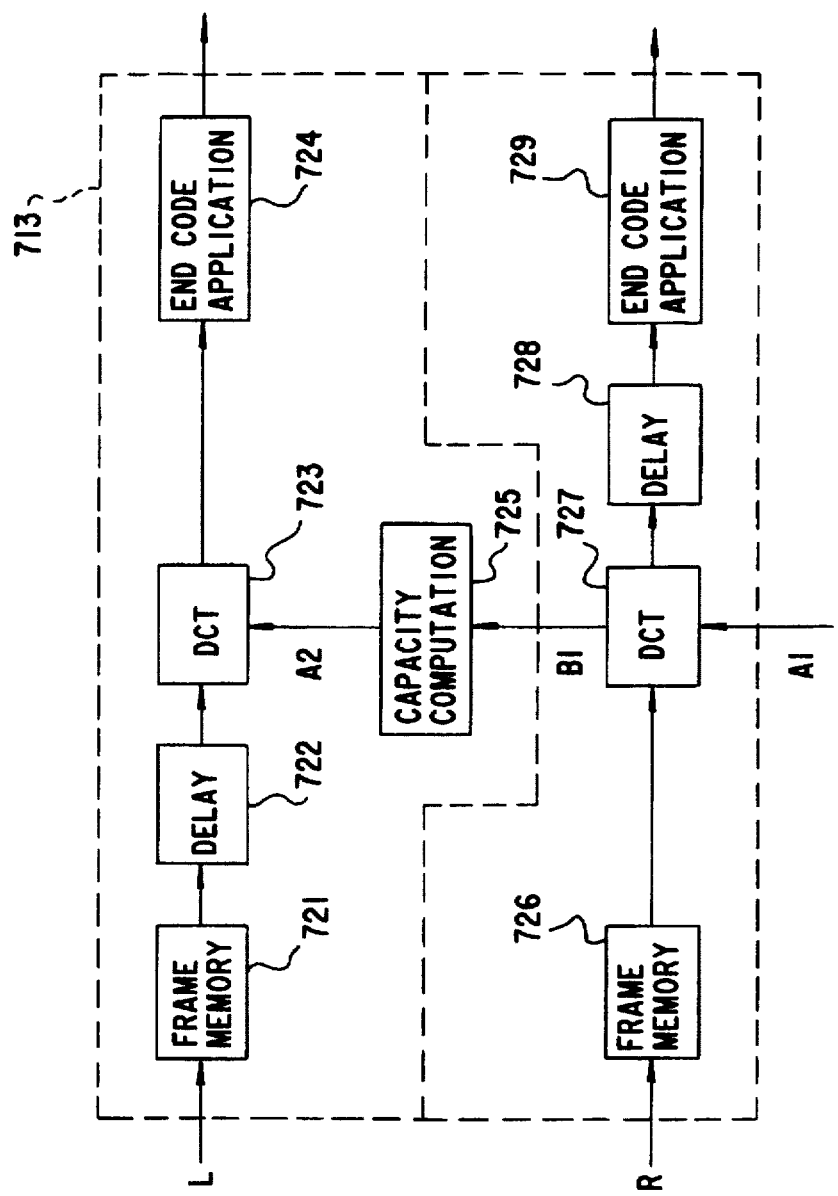
FIG. 30 is a detailed block diagram showing a data compression encoding circuit of FIG. 29.
Figure 31:
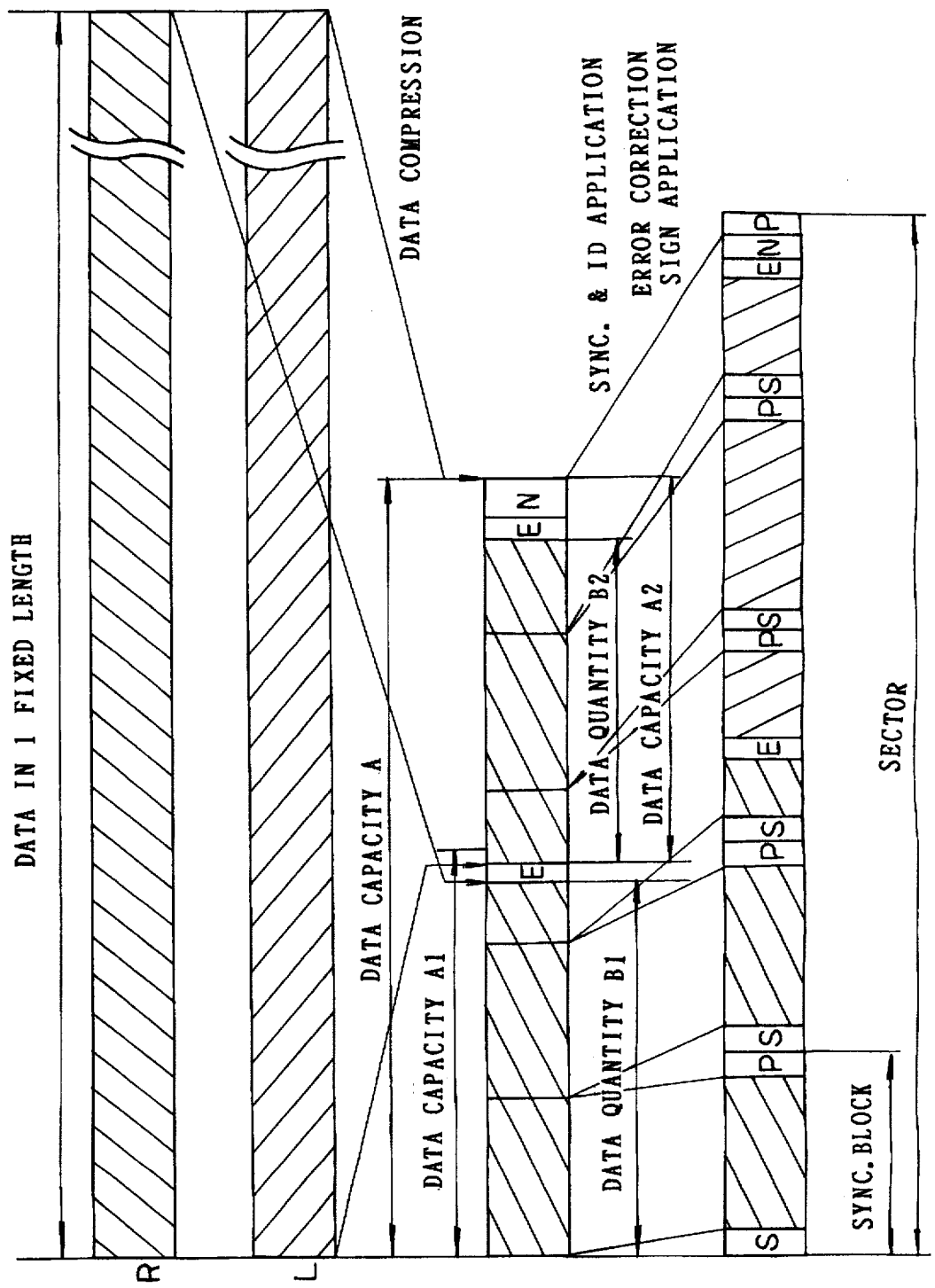
FIG. 31 is a model view showing a data arrangement of FIG. 29.

FIG. 30 shows details of the first and second data compression encoding circuits which characterize the present invention while FIG. 31 illustrates an arrangement of recorded data.

The first data compression encoding circuit 712 is comprised of a frame memory 726, a DCT circuit 727, a delay circuit 728, and a end sign apply circuit 729. The right channel data R in single fixed length is once stored in the frame memory 726, and after divided into several blocks in 8×8 pixels, they are orthogonally transformed by a DCT circuit 727 and compressed. The DCT circuit 727 is adjusted to have upper limit A1 of the quantity of compressed data. As a result of compression, data having the data quantity of B1 is obtained, and after the data is delayed by a period of time required for the compression in single fixed length by a delay circuit 728, a first end sign is applied to the data by the end sign apply circuit 729, and then the data is outputted. On the other hand, the second data compression encoding circuit 713 is comprised of a frame memory 721, a delay circuit 722, a DCT circuit 723, a capacity computing circuit 725 and an end sign apply circuit 724. Then, the left channel data L in single fixed length is once stored in the frame memory 721, and after delayed by a period of time required for compression in single fixed length by the delay circuit 722, the data is orthogonally transformed and compressed by the DCT circuit 723. The capacity computing circuit 725 subtracts the data quantity B1 of the compressed right channel data R and the first and second end sign data quantities from the whole capacity A recordable in one sector to compute the quantity A2 of compressible data of the left channel data L and transmits a computation result to the DCT circuit 723.

Thus, the DCT circuit 723 is adjusted so as to have upper limit A2 of the quantity of the compressed data. As a result of compression, after data of the data quantity of B2 is obtained, a second end sign is applied to the data, and then the data is output.

The delay circuit 722 is positioned in the previous state to the DCT circuit 723 because a compression ratio of the left channel data is set depending upon the result of the compression of the right channel data R. The delay circuit 728 is positioned in the following stage to the DCT circuit 727 because output of the right channel data must be matched in time to output of the left channel data L.

After the compressed data is divided into several blocks, the synchronization and ID sign S is applied to the head of each of the blocks while the error correction sign P is applied to the tail of each block, and thus, synchronization blocks are made. The synchronization blocks are recorded in specified sectors of tape.

In the reproducing procedure, data recorded on tape 706 is reproduced by a reproducing head 707 as in the prior art, and the reproduced data is equalized in waveform and demodulated by an equalization demodulation circuit 708. Moreover, the synchronization sign and the ID sign are detected by a synchronization and ID detection circuit 709, and after data error detection and error correction are performed by a error detection/correction circuit 710, the resultant data is separated into the right channel data R and the left channel data L by a data separation circuit 715. The right channel data R and the left channel data L are respectively decoded by first and second data expansion decoding circuit 716, 717, respectively.

Figure 32:
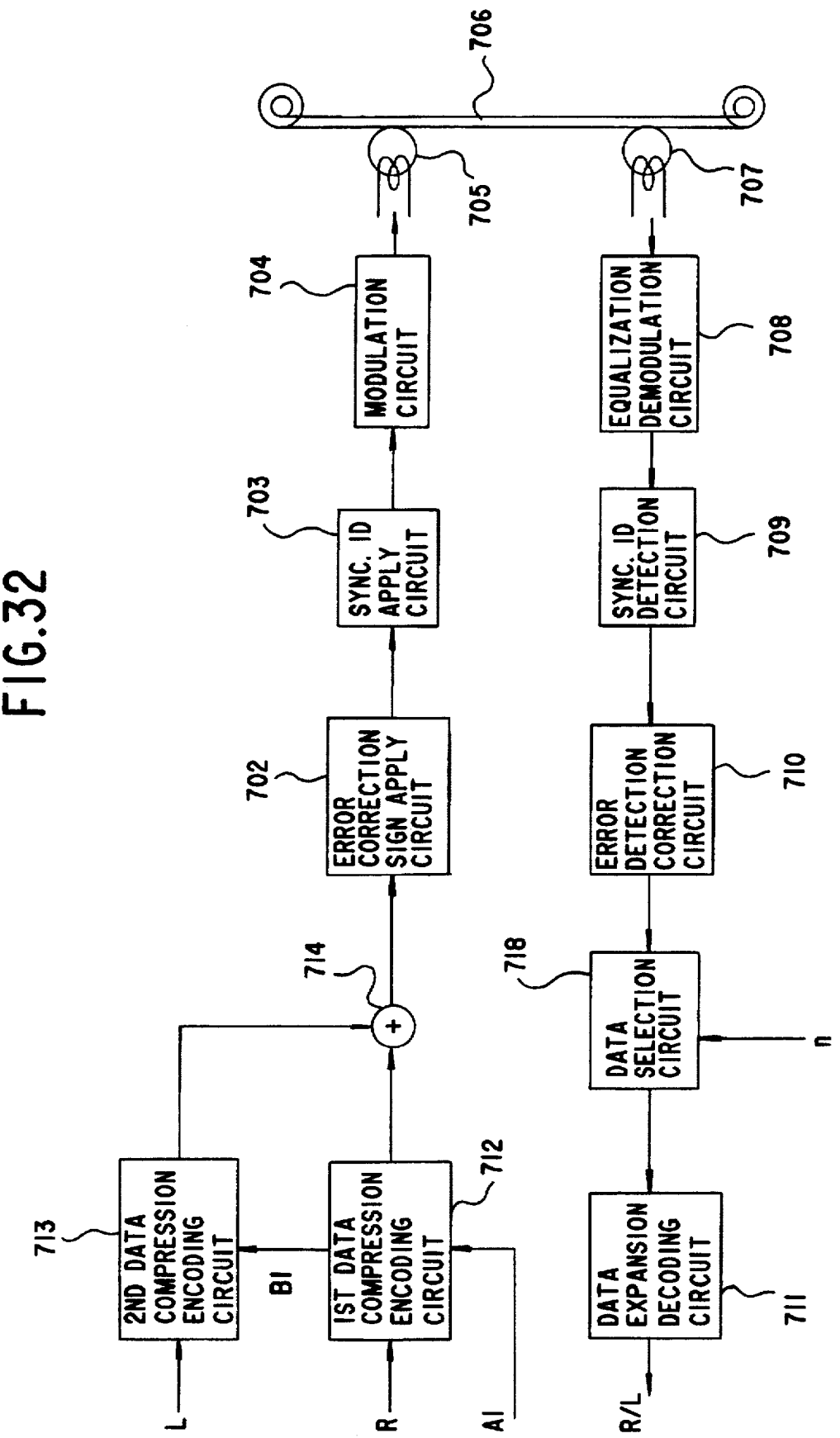
FIG. 32 is a block diagram showing a digital VTR in which a picture signal recording method of a variation of the eighth preferred embodiment of the present invention is implemented.

FIG. 32 depicts a variation of this embodiment. This variation is characterized by its reproducing system; output from the error detection/correction circuit 710 is transmitted via a data selection circuit 718 to a data expansion decoding circuit 711. The data selection circuit 718 receives a selection signal n to select and output the head of th sector to the first end code if the right channel data R is desired, or otherwise to select and output from just after the first end code to the end of a data sequence if the left channel data L is desired. Then, the data expansion decoding circuit 711 decodes the right channel data R or the left channel data L.

Figure 33:
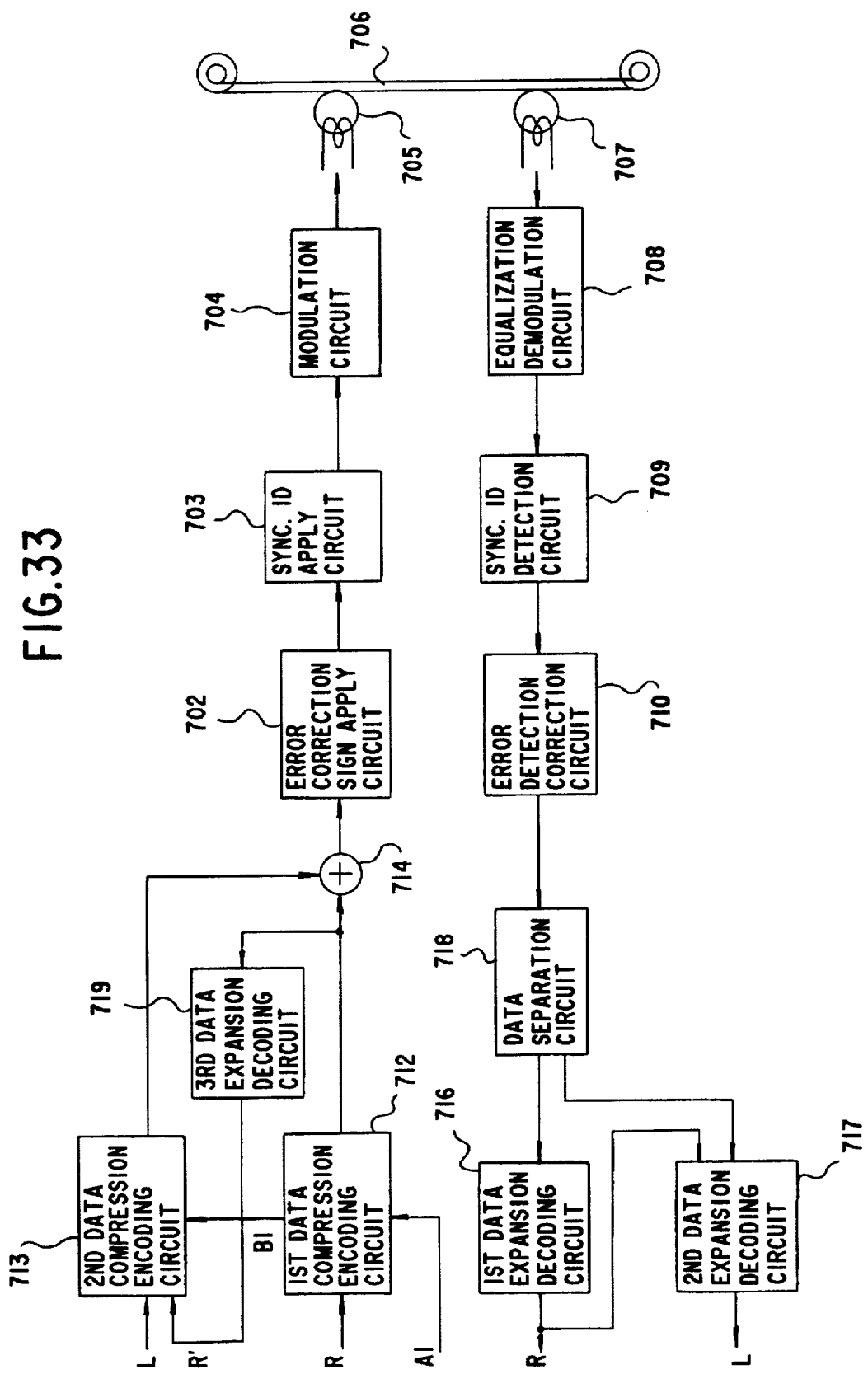
FIG. 33 is a block diagram showing a digital VTR in which a picture signal recording method of another variation of the eighth preferred embodiment of the present invention is implemented.

FIG. 33 illustrates another variation of this embodiment. This embodiment is characterized in that there is provided a third data expansion decoding circuit 719 which expands and decodes output from the first data compression encoding circuit 713 for encoding the right channel data R and that a difference data of right channel data R' decoded by the third data expansion decoding circuit 719 and the left channel data L is encoded by the second data compression encoding circuit 713. Output from the adding circuit 714 is the sum of the encoded right channel data R added to the encoded difference data. Thus, since the difference data of the channel data R and L correlated to each other is compressed and encoded, compression efficiency is enhanced, compared with a case where the left channel data L itself is compressed and encoded.

In the reproducing procedure, the second data expansion decoding circuit 717 decodes the left channel data L by adding the difference data once encoded and then decoded to the right channel data R decoded by the first data expansion decoding circuit 716.

In this variation, although output from the third data compression encoding circuit 719 is used in obtaining a difference between the right channel data R and the left channel data L in the recording procedure, this is because it is intended that an error caused by the compression and expansion of the right channel data R not be accumulated in a result of the compression and expansion of the left channel data L. The third data expansion decoding circuit 719 may be used in common with the first data expansion decoding circuit 716, or if an accumulated error is negligible, the right channel data R may be directly applied to the second data compression encoding circuit 712.

Figure 38:
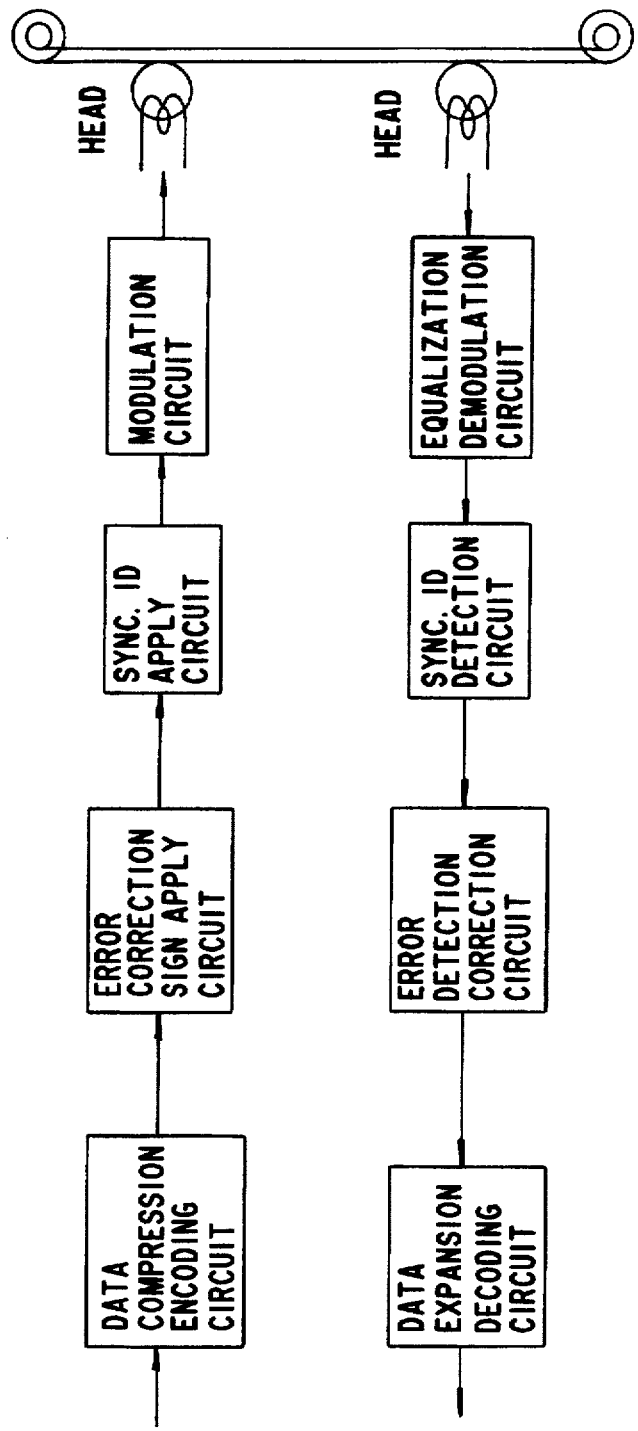
FIG. 38 is a block diagram showing a prior art digital VTR.
Figure 39:
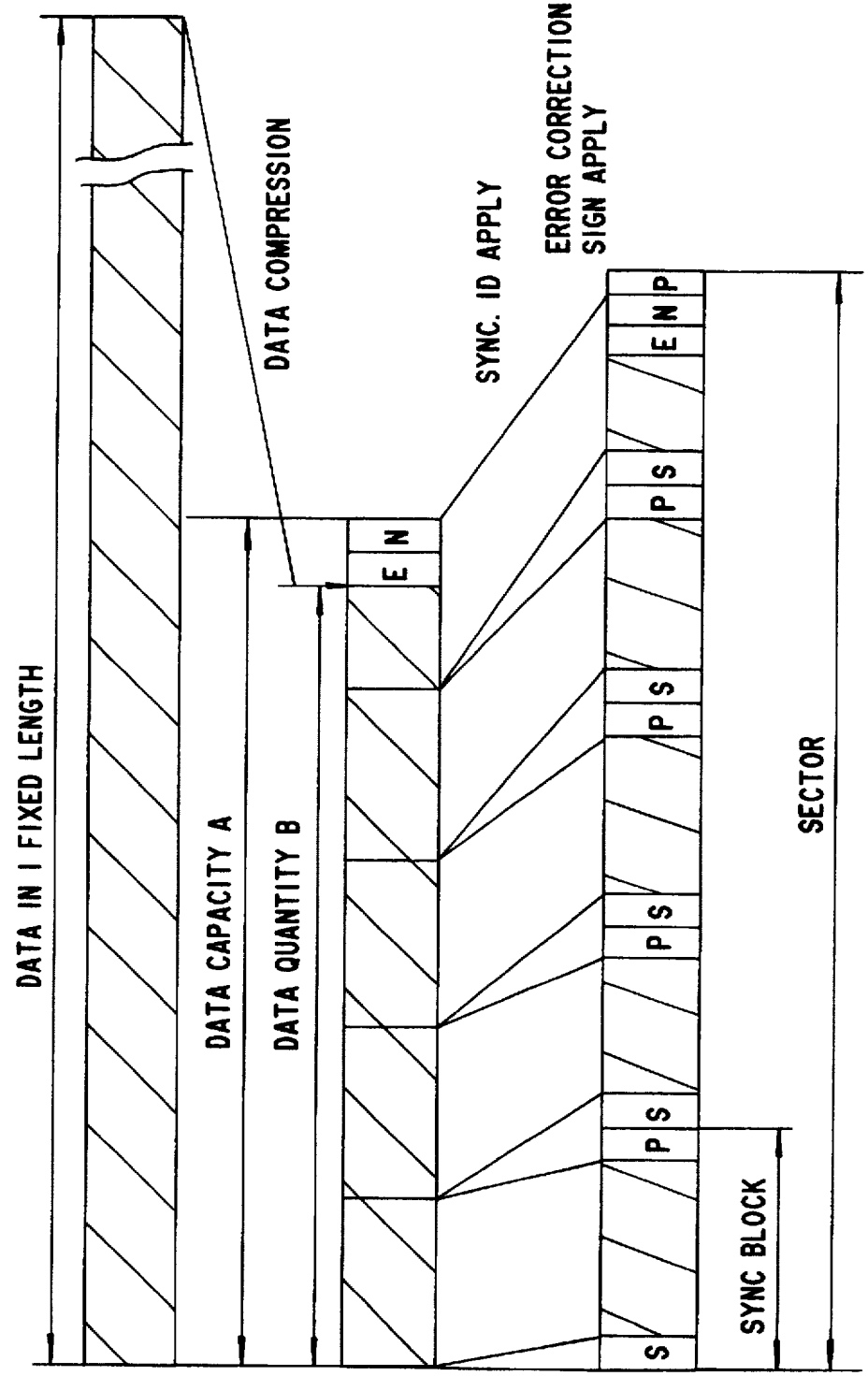
FIG. 39 is a diagram showing a format of a record track in a prior art digital VTR.

When stereoscopic picture signals recorded on tape in the digital VTR in this embodiment are reproduced by a prior art single channel digital VTR equivalent in format as shown in FIGS. 38 and 39, since only data from the head of the sector to the first end code is decode, the right channel data R can be reproduced without problem although a compression ratio is different. Furthermore, signals recorded on recording medium in the prior art digital VTR can be reproduced without problem by the digital VTR of this embodiment, and thus, compatibility is assured.

Although, in the above embodiment, first and second input data sequences are recognized as stereoscopic picture data, the second data sequence may be recognized as a data sequence for interpolating the first data sequence on the time bases, and the first and second data sequences may be alternately output on the time basis so as to reproduce pictures moving more smoothly.

The first data sequence may have band of an ordinary television signal while the second data sequence may have high definition, and thus, television signals of high definition can be recorded/reproduced with compatibility with the prior art digital VTR.

Moreover, three or more data sequences may be input as the input data sequences.

As has been described, in the eighth preferred embodiment of the present invention, multi-channel information data can be efficiently compressed for recording/reproducing them.

After an end code is applied to the tail of a first data sequence which is obtained by compressing and encoding a data sequence of the first channel of all the channels, the data sequence may be recorded from the head of a specified recording region in the recording medium, so that the data sequences can be reproduced by a prior art single channel digital information recording/reproducing apparatus equivalent in recording format. Data recorded on recording medium in the digital information recording/reproducing apparatus can be reproduced by the digital information reproducing apparatus in this invention, and thus, compatibility is assured.

Figure 34:
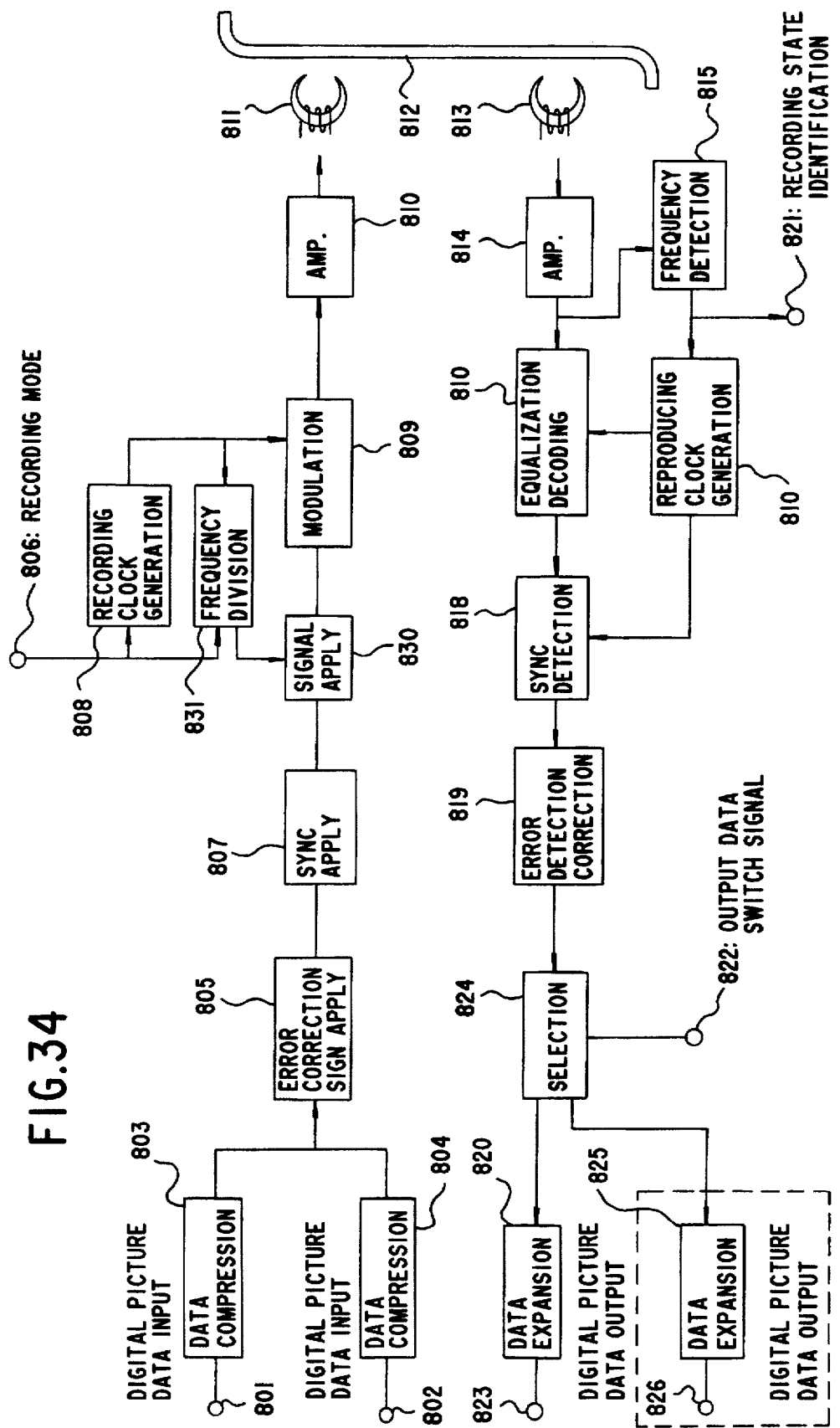
FIG. 34 is a block diagram showing a digital VTR in which a picture signal recording method of a ninth preferred embodiment of the present invention is implemented.

A ninth preferred embodiment of the present invention will now be described with reference to FIGS. 34 and 35. FIG. 34 is a schematic block diagram showing a picture signal recording/reproducing apparatus in this embodiment.

First, a recording system will be discussed below. Digital picture data are received on input units 801, 802, and the input digital picture data are compressed by data compressors 803, 804, respectively.

An error correction sign apply unit 805 applies an error correction sign to the resultant compressed data, and further, a SYNC apply circuit 807 applies data such as SYNC. These data are recorded in a data area on a recording track.

Then, a signal apply circuit 830 applies a signal required for pulling in clocks (herein clock referred to as "clock pull-in frequency signal") to the data area. The clock pull-in frequency signal is equal in either of the cases where a single picture signal is recorded and where two picture signals are recorded. This processing of equalizing frequency of the clock pull-in frequency signal is performed by a frequency divider 831 mentioned later.

A recording mode signal is received on a recording mode signal input unit 806. The recording mode signal is applied to a recording clock generator 808 and the frequency divider 831. The recording clock generator 808 generates a clock CL1 if the recording mode signal represents a mode to record a single picture signal or otherwise generates a clock CL2 twice as much as the clock CL1 if the recording mode signal represents a mode to record two picture signals to transmit it to a modulator 809 and the frequency divider 831.

The frequency divider the 831 divides frequency of the clock received from the recording clock generator 808 in accordance with the recording mode to apply the resultant signal to the signal apply circuit 830. Specifically, the frequency divider 831 divides the clock CL1 to a ½ frequency if the recording mode represents the mode to record a single picture signal or otherwise it divides the clock CL2 to ¼ frequency if the recording mode signal represents the mode to record two picture signals. In this way, the clock pull-in frequency signal in recording a single picture signal and that in recording two picture signals are equal to each other.

The modulator 809 modulates a signal to be recorded in accordance with the input clock, and the resultant modulated signal is transmitted to a recording amplifier 810. When the clock CL2 is applied to the modulator 809, a recording bit rate is adjusted to twice as high as an ordinary level.

The signal undergoing the recording amplifier 810 is transmitted to a recording head (rotational head) 811, and the signal to be recorded is recorded on recording tape 812 by the recording head 811.

A tape feeding system (not shown) and a rotational cylinder for revolving the recording head 811 are driven at ordinary operation speed and rotation velocity if the recording mode signal represents the mode to record a single picture signal; otherwise, if the recording mode signal represents the mode to record two picture signals, they are driven twice as high as the ordinary operation speed and rotation velocity.

Figure 35:
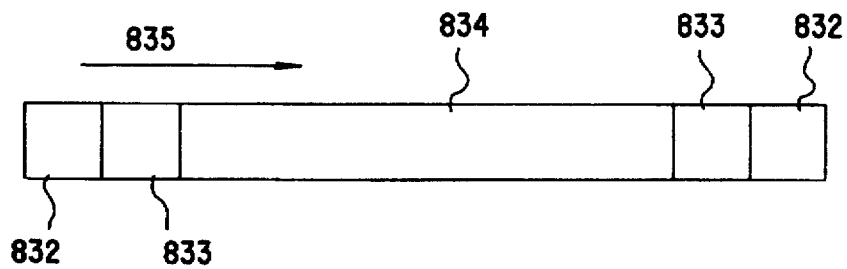
FIG. 35 is a diagram showing a format of a record track in the recording method of FIG. 34.
Figure 36:
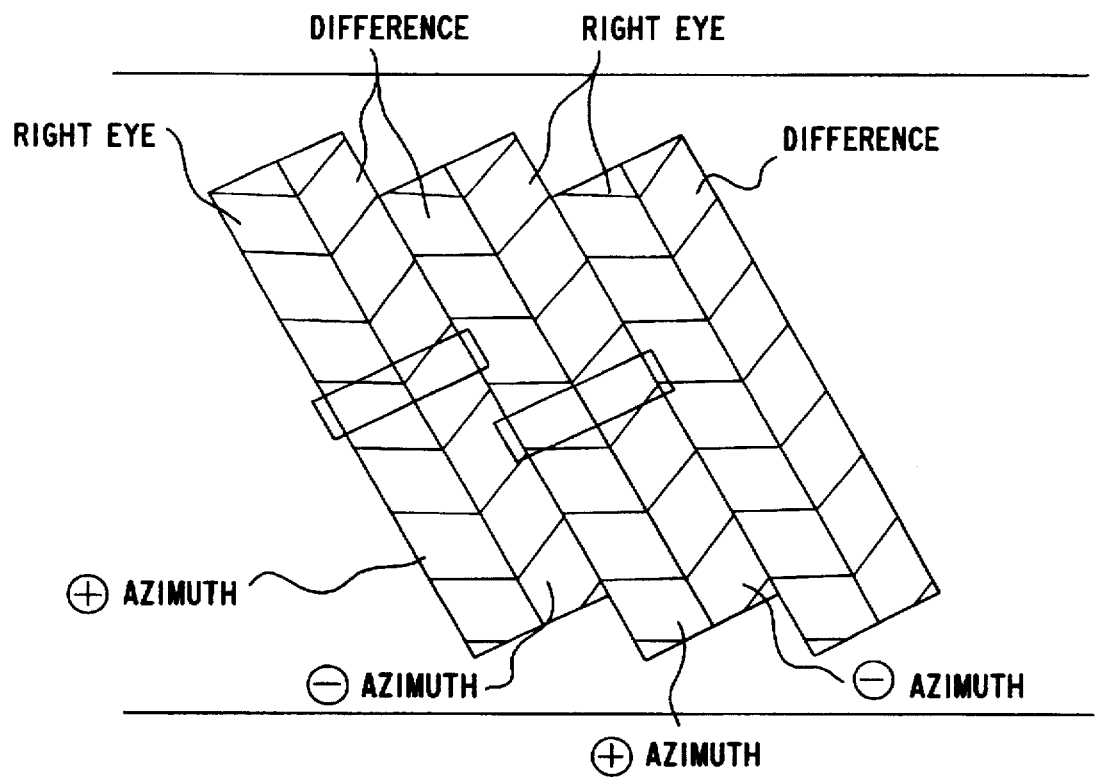
FIG. 36 is a model view showing a recording pattern on tape in a prior art picture signal recording method.
Figures 1, 37A:
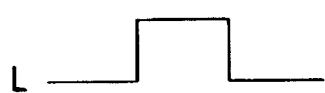
FIGS. 37A through 37B are diagrams illustrating waveform distortion of a difference signal in reproducing stereoscopic pictures recorded by using the difference signal in the prior art.
Figures 1, 37B:
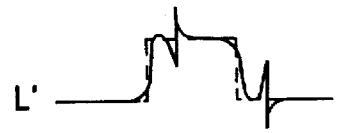
Figures 2, 37A:
Figures 2, 37B:
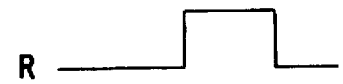
Figures 3, 37A:
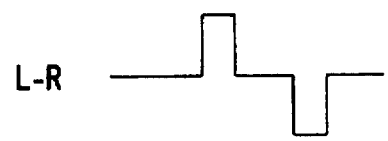
Figures 3, 37B:
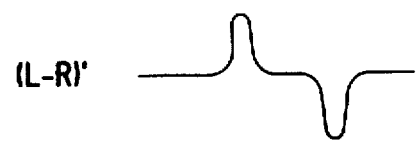

FIG. 35 is a diagram showing a format of a skew track. The skew track is divided into three areas; an area 832 where the clock pull-in frequency signal is recorded, an area 833 for ATF (auto tracking follower), and a data area 834. Arrow in FIG. 35 designates a direction of movement of the head.

When two picture signals are recorded, as mentioned above, the tape feeding speed and the rotation velocity of the rotational cylinder (recording head 811) become twice as high as the ordinary ones, and the recording bit rate is also doubled. Thus, the recording track shown in FIG. 35 is equal in its tilt angle and recording density on the recording tape in either cases where a single picture signal is recorded and where two picture signals are recorded. However, since the clock pull-in frequency signal written in the area 832 is adjusted so that its frequency is equal in either cases where a single picture signal is recorded and where two picture signals are simultaneously recorded, assuming that a recording wavelength of the signal on the recording tape is $\lambda$ in recording a single signal, the wavelength in recording two picture signals is $2\lambda$.

Next, a reproducing system will be described below. In this embodiment, reproducing begins with normal reproducing.

Signals recorded on the recording tape 812 is reproduced by a reproducing head 813 and amplified by a reproducing amplifier 814. The resultant amplified signal is transmitted to a frequency detector 815 and an equalization decoder 817.

The frequency detector 815 detects the clock pull-in frequency signal recorded before the data area 834 to determine if a single picture signal is recorded or two picture signals are, and it further transmits a result of its determination as a recording state identification signal to an output unit 821 to a servo system and a reproducing clock generator 816.

Such a determination relies upon the frequency of the clock pull-in frequency signal. Specifically, as state above, assuming that a recording wavelength of the signal on the recording tape is $\lambda$ recording a single signal, the wavelength in simultaneously recording two picture signals is $2\lambda$. Thus, if the frequency of the clock pull-in frequency signal reproduced in a normal conditions is f, it may be determined one picture signal is recorded since the wavelength recorded is $\lambda$, or otherwise, if the frequency in the normal reproducing conditions is f/2, it may be determined that two picture signals are recorded since the wavelength recorded is $2\lambda$. Meanwhile, if the frequency of the reproduced signal is f in simultaneously reproducing two picture signals, it may be determined that two picture signals are recorded. On the other hand, if the frequency in simultaneously reproducing two picture signals is 2f, it may be determined that one picture signal is recorded.

When it is determined, in accordance with the recording state identification signal based upon the above decision, that two picture signals are recorded, the tape feeding speed, the rotation rate of the cylinder and the reproducing bit rate are switched to the doubled levels in the servo system. The reproducing clock generator 816 regulates an operation of doubling the reproducing bit rate. When a reproducing mode for two picture signals is executed, a detected frequency ranges from f/2 to f. In other words, controlling the tape feeding speed and the like so that the frequency of the reproduced signal becomes f, a recording state is automatically recognized and the desired reproducing is performed.

The reproducing clock generator 816 generates a reproducing clock based upon the reproduced clock pull-in frequency signal and the recording state identification signal and transmits the clock to the equalization decoder 817 and a SYNC detector 818.

The equalization decoder 817 decodes reproducing data in accordance with the reproducing clock to transmit the resultant signal to the SYNC detector 818. The SYNC detector 818 detects data such as SYNC data from the reproducing data decoded in accordance with the reproducing clock to find a data position.

An error detection/correction device 819 detects and corrects an error of picture data to transmit the resultant corrected data to an output data selector 824.

The output data selector 824 switches operations between applying the corrected picture data as they are to a data expanding device 820 based upon an output data switch signal received from a terminal 822 and applying pictures alternately to the data expanding device 820 and a data expanding device 825. For example, the corrected picture data are output as they are to the data expanding device 820 in reproducing at normal state while pictures are output alternately to the data expanding device 820 and the data expanding device 825 in simultaneously reproducing two pictures.

The data expanding devices 820, 825 expand data and transmits a original fixed sampling digital picture data to output units 823, 826.

As has been described, in this embodiment, it can be determined which recording system, the system for recording a single picture signal and the system for simultaneously recording two picture signals, signals are recorded, keeping matching to skew tracks on tape, and operation factors such as a tape feeding speed and the like can be adjusted depending upon the recording systems. Hence, for example, even if two pictures are simultaneously recorded to the middle of the recording tape and thereafter a single picture signal is recorded, an appropriate reproducing operation is attained.

Although, in this embodiment, the frequency of the clock pull-in frequency signal is equal in either the recording modes so that the recording modes can be identified, an identification signal for identifying the recording modes may be recorded (applied) in addition to a clock producing signal at the beginning or the end of the skew track or the so-called margin area so that the recording modes can be identified. In such a case, ¼ frequency division by the frequency divider 831 is needless, and the identification signal can be applied by the signal apply circuit 830.

Such a technique that the identification signal is applied as mentioned above may be applied not only to a digital picture signal recording/reproducing apparatus but also to an analog picture signal recording/reproducing apparatus. When it is applied to the analog picture signal recording/reproducing apparatus, picture data may be compressed on the time basis in order to simultaneously record two picture signals.

As previously mentioned, in the ninth preferred embodiment according to the present invention, operation factors such as a tape feeding speed and the like are doubled in recording two picture signals to keep matching to skew tracks on tape in recording a single picture signal, so that recording/reproducing one picture signal is also allowed in the same system; and thus, compatibility with an existing VTR can be assured. Furthermore, since it is determined if one picture signal is recorded on recording tape or two picture signals are, to make a reproducing condition appropriate to the recording system, even if the recording condition is varied from recording one picture signal to recording two picture signal in the course of operation, this can be detected, and an appropriate reproducing operation can be performed. This embodiment has another effect that a circuit for synchronizing two picture signals is needless.

What is claimed is:

1. A method of recording at least two picture signals, characterized in that first picture signals R1 to Rn for right eye and first picture signals L1 to Ln for left eye are recorded in a primary signal recording region consisting of skew tracks of a half of a track pitch of skew tracks on VHS system or 8 mm system recording tape, any adjacent ones of the skew tracks having azimuth angles reverse to each other, the first picture signals for right and left eyes being recorded in order of L1, R1, R2, L2, L3, R3 and so forth along a direction of movement of the recording tape, and that difference signals (R'1–R1) to (R'n–Rn) of second picture signals R'1 to R'n for right eye and the first picture signals R1 to Rn for right eye, or difference signals (L'1–L1) to (L'n–Ln) of second picture signals L'1 to L'n for left eye and the first picture signals L1 to Ln for left eye are recorded in an overlapping region of the skew tracks corresponding to the picture signals for right eye or the picture signals for left eye recorded in the primary signal recording region.

2. A method according to claim 1, further comprising the step of forming the skew track using a first pair of recording heads and a second pair of recording heads arranged at an interval of approximately 180°.

3. The method as claimed in claim 2, further comprising the step of arranging the first pair of recording heads and arranging the second pair of recording heads the same with respect to each other.

4. A method according to claim 2, wherein arranging the first pair of recording heads and arranging the second pair of recording heads symmetrical to each other.

5. The method according to claim 1, further comprising the step of forming the skew track using a pair of recording heads by compressing signals to be recorded on a time basis to ½ and doubling a number of rotations of a drum.

* * * * *